(12) United States Patent
Lee et al.

(10) Patent No.: US 10,582,192 B2
(45) Date of Patent: Mar. 3, 2020

(54) DISPLAY APPARATUS

(71) Applicant: Samsung Electronics Co., Ltd., Suwon-si, Gyeonggi-do (KR)

(72) Inventors: Jinho Lee, Suwon-si (KR); Dong Kyung Nam, Yongin-si (KR); Kyuhwan Choi, Yongin-si (KR); Yoonsun Choi, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 470 days.

(21) Appl. No.: 14/940,380

(22) Filed: Nov. 13, 2015

(65) Prior Publication Data

US 2016/0150221 A1 May 26, 2016

(30) Foreign Application Priority Data

Nov. 24, 2014 (KR) .................. 10-2014-0164310
Jul. 3, 2015 (KR) .................. 10-2015-0095064

(51) Int. Cl.
  *H04N 13/307* (2018.01)
  *G09G 3/36* (2006.01)
  (Continued)

(52) U.S. Cl.
  CPC ......... *H04N 13/307* (2018.05); *G02B 6/0045* (2013.01); *G02B 6/0051* (2013.01);
  (Continued)

(58) Field of Classification Search
  CPC .. G02B 6/0011; G02B 6/0036; G02B 6/0038; G02B 6/0043
  See application file for complete search history.

(56) References Cited

U.S. PATENT DOCUMENTS 7,876,397 B2   1/2011 Krijn et al.
2008/0030650 A1*  2/2008 Kitagawa ............ G02B 6/0068
                                                 349/65
(Continued)

FOREIGN PATENT DOCUMENTS

CN    102734701 A   10/2012
GB      2410116 A    7/2005
(Continued)

OTHER PUBLICATIONS

Masaru Minami, et al. "Glasses-Free 2D/3D Switchable Display Using a Unique Light Guide" SID Symposium Digest, vol. 11, pp. 468-471, (2011).

(Continued)

*Primary Examiner* — Anh T Mai
*Assistant Examiner* — Zachary J Snyder
(74) *Attorney, Agent, or Firm* — Harness, Dickey & Pierce, P.L.C.

(57) ABSTRACT

A display apparatus, and a light guide plate (LGP) of the display apparatus are provided. The LGP may include a first light guide segment and a second light guide segment that are alternately arranged in a first direction. The first light guide segment and the second light guide segment may be separated from each other by a light barrier. Light guided and output in the LGP may be diffused in one direction by an anisotropic diffuser. The first light guide segment may be configured to guide light from a first light source used to generate a two-dimensional (2D) image. The second light guide segment may be configured to guide light incident from a second light source used to generate a three-dimensional image.

28 Claims, 22 Drawing Sheets

(51) Int. Cl.
  *F21V 8/00* (2006.01)
  *G02B 27/22* (2018.01)
  *H04N 13/31* (2018.01)
  *H04N 13/315* (2018.01)

(52) U.S. Cl.
  CPC ......... *G02B 6/0068* (2013.01); *G02B 6/0078* (2013.01); *G02B 27/22* (2013.01); *G09G 3/36* (2013.01); *H04N 13/31* (2018.05); *H04N 13/315* (2018.05)

(56) References Cited

U.S. PATENT DOCUMENTS

| | | | |
|---|---|---|---|
| 2008/0084512 A1 | 4/2008 | Brott et al. | |
| 2008/0084513 A1 | 4/2008 | Brott et al. | |
| 2008/0084518 A1 | 4/2008 | Brott et al. | |
| 2008/0084519 A1 | 4/2008 | Brigham et al. | |
| 2008/0086289 A1 | 4/2008 | Brott | |
| 2008/0316596 A1* | 12/2008 | Cha | G02B 27/2214 359/463 |
| 2009/0067156 A1* | 3/2009 | Bonnett | G02B 6/0068 362/97.2 |
| 2011/0134347 A1 | 6/2011 | Brott et al. | |
| 2011/0273636 A1 | 11/2011 | Schultz et al. | |
| 2012/0243259 A1* | 9/2012 | Zhou | G02B 6/0036 362/613 |
| 2012/0257406 A1 | 10/2012 | Minami | |
| 2012/0299985 A1 | 11/2012 | Ichihashi et al. | |
| 2013/0329457 A1 | 12/2013 | Huang | |
| 2014/0286044 A1 | 9/2014 | Johnson et al. | |

FOREIGN PATENT DOCUMENTS

| | | |
|---|---|---|
| JP | 2008034372 A | 2/2008 |
| JP | 4412167 B2 | 2/2010 |
| JP | 2010231214 A | 10/2010 |
| JP | 2013-104915 A | 5/2013 |
| JP | 201310417 A | 5/2013 |
| JP | 2014-103049 A | 6/2014 |
| KR | 2011-0021164 A | 3/2011 |
| KR | 10-1045203 B1 | 6/2011 |
| KR | 2013-0085209 A | 7/2013 |
| KR | 101406794 B1 | 6/2014 |
| TW | 200834184 A | 8/2008 |
| WO | WO-2008/045681 A1 | 4/2008 |

OTHER PUBLICATIONS

Extended European Search Report dated Apr. 14, 2016 issued in corresponding European Patent Application No. 15196075.4.
Eichenlaub "A lightweight, Compact 2D/3D Autosteroscopic LCD Backlight for Games, Monitor, and Notebook Applications", Proceeding of the SPIE, vol. 3295, XP002755916, pp. 180-185 (1998).
Eichenlaub "A lightweight, Compact 2D/3D Autosteroscopic LCD Backlight for Games, Monitor, and Notebook Applications", Proceeding of the SPIE, XP002755917, pp. 274-281 (1997).
Chinese Office Action dated Oct. 8, 2018 for Chiinese Appl. No. 201510823471.7.
Office Action dated Dec. 3, 2019, issued in corresponding Japanese Patent Application No. 2015-229080.

* cited by examiner

410

420

510

520

530

531

540

541

730

IG. 7E

740

750

710

720

Sectional view in Y direction

DISPLAY APPARATUS

CROSS-REFERENCE TO RELATED APPLICATIONS

This application claims priority under 35 U.S.C. § 119 to Korean Patent Application No. 10-2014-0164310 and Korean Patent Application No. 10-2015-0095064, respectively, filed on Nov. 24, 2014 and Jul. 3, 2015, in the Korean Intellectual Property Office, the entire contents of which are incorporated herein by reference in its entirety.

BACKGROUND

1. Field

Example embodiments relate to a display apparatus, and more particularly, to an operation control and/or a structure of a light guide plate (LGP) of a display apparatus for providing a two-dimensional (2D) image and a three-dimensional (3D) image.

2. Description of Related Art

To implement a glasses-free three-dimensional (3D) display using a flat panel display (FPD), using an optical plate to divide a viewpoint on a front surface of the FPD may be used. The optical plate may include, for example, a lenticular lens, and a parallax barrier. In a lenticular lens scheme, a plurality of cylinder lenses having a small pitch may be arranged on a front surface of a two-dimensional (2D) FPD, and a right eye image and a left eye image may be separated. In a parallax barrier scheme, a barrier to limit a light traveling direction may be disposed on a front surface of a FPD, and different images may be provided to a right eye and a left eye.

SUMMARY

Example embodiments relate to a light guide plate (LGP).

According to example embodiments, a LGP may include a first light guide segment and a second light guide segment that are alternately arranged in a first direction. The first light guide segment may be configured to guide light incident from a first light source used to generate a two-dimensional (2D) image, and the second light guide segment may be configured to guide light incident from a second light source used to generate a three-dimensional (3D) image.

In example embodiments, the first light guide segment may be configured to output the light incident from the first light source as output light with a square dot pattern, and the second light guide segment may be configured to output the light incident from the second light source as output light with a square dot pattern. The LGP may further include a diffuser. The diffuser may be configured to change the output light corresponding to the first light guide segment to planar light, and the diffuser may be configured to change the output light corresponding to the second light guide segment to light with a stripe pattern. A portion of the diffuser corresponding to the first light guide segment may be configured to perform an isotropic diffusion, and a portion of the diffuser corresponding to the second light guide segment may be configured to perform an anisotropic diffusion. The diffuser may be in the form of a single film. The diffuser may include a first diffuser and a second diffuser. The first diffuser may be configured to perform a diffusion in the first direction, and the second diffuser may be configured to perform a diffusion in a second direction that is different from the first direction.

In example embodiments, the first light guide segment may output the light incident from the first light source as first output light with a stripe pattern corresponding to the second direction, and the second light guide segment may output the light incident from the second light source as second output light with a square dot pattern.

In example embodiments, the LGP may further include an anisotropic diffuser. The anisotropic diffuser may be configured to change the first output light to planar light by diffusing the first output light in the first direction, and the anisotropic diffuser may be configured to change the second output light to light with a stripe pattern by diffusing the second output light in the first direction. The LGP may further include a diffuser that is above the first light guide segment and the second light guide segment, and the diffuser may include a first region and a second region. The first region may be configured to change the first output light to planar light by isotropically diffusing the first output light, and the second region may be configured to change the second output light to light with a stripe pattern by anisotropically diffusing the second output light.

In example embodiments, the LGP may further include a light barrier that separates the first light guide segment from the second light guide segment. The light barrier may be doped, but not limited thereto. The doped light barrier portion may have a different refractive index than the first light guide segment and the second light guide segment. Due to the above difference in the refractive index, the light barrier portion may optically separate the first light guide segment and the second light guide segment. However, the light barrier is merely an example, and another application example may be provided. For example, the light barrier may be a space formed by a cut between the first light guide segment and the second light guide segment. In this example, at least a portion of the light barrier may be coated with a material having a reflectance equal to or greater than a threshold. By the above coating layer, the first light guide segment and the second light guide segment may be optically separated.

In example embodiments, the first light guide segment and the second light guide segment may have identical widths. A width of the first light guide segment, and a width of the second light guide segment may be different from each other. The LGP may further include an anisotropic diffuser disposed above the LGP, for example, between a liquid crystal display (LCD) panel and the LGP. The anisotropic diffuser may diffuse light output from the first light guide segment and the second light guide segment in the first direction. At least one of the width of the first light guide segment and width of the second light guide segment may be within a diffusion range of the anisotropic diffuser.

In example embodiments, the LGP may further include a light block configured to isolate the second light guide segment from the first light source from which the light is incident to the first light guide segment, and to isolate the first light guide segment from the second light source from which the light is incident to the second light guide segment. A position and a direction of the light block may be determined based on a position of the first light source and a position of the second light source. For example, the first light source may be used to provide a 2D image, and the second light source may be used to provide a 3D image, however, there is no limitation thereto.

Example embodiments relate to a display apparatus.

According to example embodiments, a display apparatus may include an LGP, a first light source, and a second light source. The first light source may be configured to provide light to provide a 2D image through a panel of the display apparatus. The second light source may be configured to provide light to provide a 3D image through the panel. To provide a 2D image, light incident from the first light source may be guided by a first light guide segment of the LGP. To provide a 3D image, light incident from the second light source may be guided by a second light guide segment of the LGP. In the LGP, the first light guide segment and the second light guide segment may be alternately arranged in a first direction. The first light guide segment and the second light guide segment may be optically separated by a light barrier.

In example embodiments, the display apparatus may further include a diffuser. The diffuser may be configured to change the output light corresponding to the first light guide segment to planar light by diffusing the output light corresponding to the first light guide segment. The diffuser may be configured to change the output light corresponding to the second light guide segment to light with a stripe pattern by diffusing the output light corresponding to the second light guide segment. Each of the first light guide segment and the second light guide segment may be configured to output light with a discontinuous pattern. A portion of the diffuser corresponding to the first light guide segment may be configured to perform an isotropic diffusion, and a portion of the diffuser corresponding to the second light guide segment may be configured to perform an anisotropic diffusion. The diffuser may be in the form of a single film. The diffuser may include a first anisotropic diffuser and a second anisotropic diffuser. The first anisotropic diffuser may be configured to perform a diffusion in the first direction, and the second anisotropic diffuser may be configured to perform a diffusion in a second direction that is different from the first direction.

In example embodiments, the first light guide segment may output the light incident from the first light source as first output light with a stripe pattern corresponding to a second direction. The second light guide segment may include a plurality of light path change patterns. The second light guide segment may be configured to output the light incident from the second light source as second output light with a discontinuous patterns using the light path change patterns. The display apparatus may further include an anisotropic diffuser. The anisotropic diffuser may be configured to change the first output light to planar light by diffusing the first output light. The anisotropic diffuser may be configured to change the second output light to light with a stripe patterns by diffusing the second output light in the first direction.

In example embodiments, the plurality of light path change patterns may be regularly repeated in the second light guide segment. The plurality of light path change patterns may include, for example, one of a V-shaped pattern, a rectangular cross section, an oval shape, and an inverted triangle.

In example embodiments, the first light source may be in a first side of the LGP. The second light source may be in a second side of the LGP.

In example embodiments, one of the first light source and the second light source may be in a side of the LGP. An other of the first light source and the second light source may be in the form of a plate facing a bottom surface of the LGP.

In example embodiments, the display apparatus may be configured to turn the first light source on in a portion of the panel corresponding to a first region and to turn the second light source on a portion of the panel corresponding to a second region in order to simultaneously provide the 2D image and the 3D image. The display apparatus may be configured to output the light incident from the first light source through at least a portion of the first light guide segment corresponding to the first region. The display apparatus may be configured to output the light incident from the second light source through at least a portion of the second light guide segment corresponding to the second region.

In example embodiments, the second light source may be disposed in a side of the second light guide segment or below the second light guide segment. The light incident from the second light source may be output as second output light with a discontinuous pattern by the plurality of light path change patterns. The display apparatus may further include an anisotropic diffuser configured to change the second output light to light with a stripe pattern by diffusing the second output light in the first direction.

In example embodiments, all portions of a diffuser may not have the same diffusion characteristic, and a first region and a second region into which the diffuser is divided may have different diffusion characteristics. For example, the first light guide segment may output the light incident from the first light source as first output light with a stripe pattern corresponding to the second direction. The second light guide segment may be formed to include a plurality of light path change patterns, and may output the light incident from the second light source as second output light with a discontinuous pattern by the plurality of light path change patterns. In this example, a diffuser included in the display apparatus and disposed above an LGP may include a first region and a second region that are alternately arranged, similarly to the first light guide segment and the second light guide segment. In the first region, the first output light may be isotropically diffused, and may be changed to planar light. In the second region, the second output light may be anisotropically diffused, and may be changed to light with a stripe pattern.

In example embodiments, the LGP may include a light barrier formed between the first light guide segment and the second light guide segment. The LGP may also include a light block to isolate the second light guide segment from the first light source, and to isolate the first light guide segment from the second light source. The light barrier and the light block may optically separate the first light guide segment and the second light guide segment, and may block a mutual interference between the first light source and the second light source.

Various examples of an arrangement of the first light source and the second light source in the display apparatus may be provided by design and/or functional requirements. In an example, the first light source may be disposed in a first side of the LGP, and the second light source may be disposed in a second side of the LGP. In another example, one of the first light source and the second light source may be disposed in a side of the LGP, and the other may be disposed in the form of a plate below the LGP.

In example embodiments, the display apparatus may simultaneously provide a 2D image and a 3D image. In response to a requirement to simultaneously provide the 2D image and the 3D image, the panel may be spatially divided into a first region and a second region. For the first region, the first light source associated with providing of a 2D image may be turned on. For the second region, the second light source associated with providing of a 3D image may be turned on. Light with different patterns may be simultaneously, independently output from the first light guide segment and the second light guide segment. The light incident from the first light source may be output through at least a portion of the first light guide segment corresponding to the first region. The light incident from the second light source may be output through at least a portion of the second light guide segment corresponding to the second region. First output light output through the first light guide segment may have a stripe pattern, and second output light output through the second light guide segment may have a square spot pattern. Using an anisotropic diffuser, the first output light may be diffused as planar light in the first region, and the second output light may be diffused as light with a stripe pattern in the second region.

According to example embodiments, a display apparatus may include an LGP including a plurality of light guide segments, the light guide segments being arranged side by side in a first direction and being separated from each other by a light barrier, a first anisotropic diffuser above the light guide segments, the first anisotropic diffuser being configured to change light with a discontinuous pattern output from a first light guide segment among the light guide segments to first output light with a stripe pattern corresponding to a second direction, the first light guide segment being configured to provide a 2D image; and a second anisotropic diffuser above the first anisotropic diffuser. The second anisotropic diffuser may be configured to change the first output light to planar light by diffusing the first output light in the first direction.

In example embodiments, the display apparatus may further include a first light source and a second light source. The first light source may be configured to turned on to input light to the first light guide segment in order provide the 2D image. The second light source may be configured to be turned on to input light to a second light guide segment among the light guide segments in order to provide the 3D image, and the second light guide segment may be different from the first light guide segment. The second light guide segment and the first light guide segment may have different structures.

In example embodiments, the first anisotropic diffuser may be not formed above the second light guide segment, to limit (and/or prevent) a second output light output from the second light source from being diffused in the second direction, and to allow the second output light to pass through the first anisotropic diffuser. The second output light passing through the first anisotropic diffuser may be diffused in a desired (and/or alternatively predetermined) direction by the second anisotropic diffuser. For example, the second anisotropic diffuser may be configured to change the second output light to light with a stripe pattern corresponding to the first direction by diffusing the second output light in the first direction.

According to example embodiments, a LGP may include a first light guide segment and a second light guide segment that are alternately arranged in a first direction, and a light barrier configured to separate the first light guide segment from the second light guide segment. The first light guide segment may include a light guide configured to output light incident from a first light source as first output light with a stripe pattern corresponding to a second direction. The second light guide segment may include a light path change pattern configured to change a direction of light incident from a second light source and to output the light as second output light with a square dot pattern. The LGP may further include an anisotropic diffuser configured to diffuse at least one of the first output light and the second output light in the first direction.

Example embodiments relate to a method of manufacturing a display apparatus.

According to example embodiments, a method of manufacturing a display apparatus may include forming an LGP by alternately arranging a first light guide segment and a second light guide segment in a first direction in a panel used to form the LGP, and forming a light barrier between the first light guide segment and the second light guide segment. The first light guide segment may include a light guide configured to output light incident from a first light source as first output light with a stripe pattern corresponding to a second direction. The second light guide segment may include a light path change pattern configured to change a direction of light incident from a second light source and to output the light as second output light with a square dot pattern. The method may further include disposing an anisotropic diffuser configured to diffuse at least one of the first output light and the second output light in the first direction.

According to example embodiments, a light guide plate (LGP) includes a plurality of first light guide segments and a plurality of second light guide segments alternately arranged in a first direction, and light barriers between the first light guide segments and the second light guide segments. The first light guide segments are configured to guide light from a first light source incident to a first boundary of the first light guide segments to exit a top boundary of the first light guide segments. The first boundary and the top boundary are different surfaces of the first light guide segments. The second light guide segments are configured to guide light from a second light source incident to a first surface of the second light guide segments to exit a top surface of the second light guide segments. The first surface and the top surface are different surfaces of the second light guide segments. The light barriers optically separate the first light guide segments from the second light guide segments.

In example embodiments, the light barriers may be spaces defined by cuts in the LGP between the first light guide segments and the second light guide segments.

In example embodiments, the light barriers may be a material that has a higher refractive index than a refractive index of the first light guide segments.

In example embodiments, the first light guide segments may be configured to guide the light incident from the first light source so the light exiting the top surface of the first light guide segments has one of a stripe pattern and a square dot pattern. The second light guide segments may be configured to guide the light incident from the second light source so the light exiting the top surface of the second light guide segments has one of a stripe pattern and a square dot pattern.

In example embodiments, the second light guide segments may include a plurality of light path change patterns spaced apart from each other. The light path change patterns may be formed by an indentation in a bottom place surface of the second light guide segments or the top lane surface of the second light guide segments.

In example embodiments, the LGP may further include a first light block and a second light block. The first light block may cover a second boundary of the first light guide segments. The second light block may cover a second surface of the second light guide segments. The first and second boundaries of the first light guide segments may be side boundaries of the first light guide segments that are opposite each other. The first and second surfaces of the second light guide segments may be side surfaces of the second light guide segments that are opposite each other. The first boundary of the first light guide segments and the second surface of the second light guide segments may be alternately arranged next to each other. The second boundary of the first light guide segments and the first surface of the second light guide segments may be alternately arranged next to each other. The first light block may be configured to limit the light from the second light source from entering the first light guide segments through the second boundary of the first light guide segments. The second light block may be configured to limit the light from the first light source from entering the second light guide segments through the second surface of the second light guide segments.

According to example embodiments, a display apparatus may include a first light source, a second light source, the LGP above, a panel facing the top boundary of the first light guide segments and the top surface of the second light guide segments, and a diffuser between the panel and the first and second light guide segments. The first light source may face the first boundary of the first light guide segments. The second light source may face the first surface of the second light guide segments.

In example embodiments, the first boundary of the first light guide segments may be a side surface of the first light guide segments. The first surface of the second light guide segments may be a side surface or a bottom surface of the second light guide segments.

In example embodiments, the first boundary of the first light guide segments may be a side surface or a bottom surface of the first light guide segments. The first surface of the second light guide segments may be a side surface of the second light guide segments.

In example embodiments, the second light guide segments may include a plurality of light path change patterns spaced apart from each other. The light path change patterns may be formed by an indentation in a bottom place surface of the second light guide segments or the top lane surface of the second light guide segments.

In example embodiments, the diffuser may include a first anisotropic diffuser and a second anisotropic diffuser. The first anisotropic diffuser may be configured to perform a diffusion in the first direction. The second anisotropic diffuser may be configured to perform a diffusion in the second direction that is different than the first direction. The first anisotropic diffuser may face the first light guide segments. The second anisotropic diffuser may face the second light guide segments.

In example embodiments, a portion of the diffuser corresponding to the first light guide segments may be configured to perform an isotropic diffusion. A portion of the diffuser corresponding to the second light guide segments may be configured to perform an anisotropic diffusion.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of non-limiting embodiments, taken in conjunction with the accompanying drawings in which like reference characters refer to like parts throughout the different views. The drawings are not necessarily to scale, emphasis instead being placed upon illustrating features of example embodiments. In the drawings:

FIGS. 7D, 7E and 7F illustrate examples of pattern, each of which corresponds to a pattern of light output from a first light guide segment, a pattern diffused by passing through a first anisotropic diffuser, and a pattern diffused by passing through the first anisotropic diffuser and a second anisotropic diffuser according to example embodiments;

DETAILED DESCRIPTION

Figure 1:
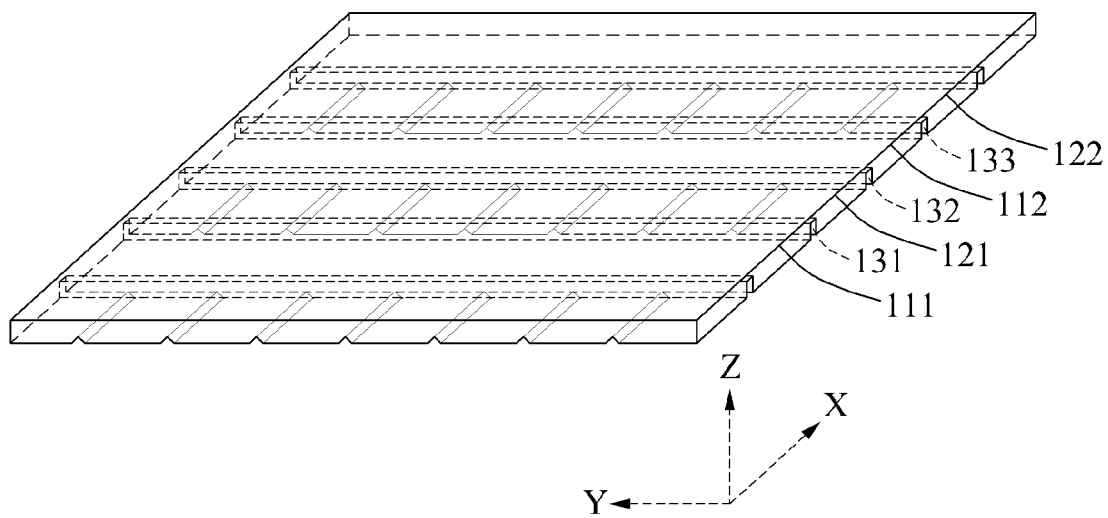
FIG. 1 is a perspective diagram of a light guide plate (LGP) according to example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure.

As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described in detail with reference to the accompanying drawings. The scope of the right may, however, should not be construed as limited to the embodiments set forth herein. Regarding the reference numerals assigned to the elements in the drawings, it should be noted that the same elements will be designated by the same reference numerals.

FIG. 1 is a perspective diagram of a light guide plate (LGP) 100 according to example embodiments. The LGP 100 may include segments to guide light incident from a light source. The segments may be, hereinafter, referred to as "light guide segments." Among the segments, first light guide segments (for example, first light guide segments 111 and 112), and second light guide segments (for example, second light guide segments 121 and 122), may be alternately arranged in a first direction. The first direction may include, but not limited to, an X-axis direction of FIG. 1. In the following description, an X axis and a Y axis may be parallel to a screen of a flat panel display (FPD), and a Z axis may be perpendicular to the screen. The first light guide segments 111 and 112 may guide light used to provide a two-dimensional (2D) image, and the second light guide segments 121 and 122 may guide light used to provide a three-dimensional (3D) image. For example, the first light guide segments 111 and 112 may guide light of a light source (not shown) for 2D images, and the second light guide segments 121 and 122 may guide light of a light source (not shown) for 3D images. The light source for 2D images and the light source for 3D images may be turned on or off, based on a selection of a viewing mode.

Various examples of schemes for implementing the light barriers in the LGP 100 may be provided. The first light guide segments (e.g., 111, 112) and the second light guide segments (e.g., 121, 122) that are alternately arranged may be separated from each other by light barriers (for example, light barriers 131, 132 and 133) to reduce (and/or block) a light interference. The light guide plate 100, for example the first light guide segments 111 and 112 and the second light guide segments 121 and 122, may be formed of a plastic material or a glass with high optical transmittance. Poly Methyl Methacrylate (PMMA), which has a refractive index of 1.49, may be used to form the first light guide segments 111 and 112 and the second light guide segments 121 and 122. Plastic materials with similar high optical transmittance to PMMA may be used to form the first light guide segments 111 and 112 and the second light guide segments 121 and 122. Also, glass, which may have refractive index of 1.52, may be used to form the first light guide segments 111 and 112 and the second light guide segments 121 and 122. One of ordinary skill in the art would appreciate that PMMA and glass are provided as non-limiting examples of suitable materials for the first light guide segments 111 and 112 and the second light guide segments 121 and 122. Other materials may be suitable depending on design considerations. The first light guide segments 111 and 112 and the second light guide segments 121 and 122 may be formed of the same material or different materials.

The light barriers 131-133 may be formed of a material that has a higher refractive index than the material(s) used for forming the first light guide segments 111 and 112 and the second light guide segments 121 and 122. For example, if glass (n=1.52) or PMMA (n=1.49) is used to form the first light guide segments 111 and 112 and the second light guide segments 121 and 122, then polyethylene terephthalate (PET) or polyethylene naphthalate (PEN) may be used to form the light barriers 131-133. However, example embodiments are not limited thereto and other materials besides PET or PEN may be used to form the light barriers 131-133. For example, Ag, Au, or black materials may be used to form the light barriers 131-133.

In another example, a light barrier portion may be doped, by discriminating the light barrier portion from the other portions of the LGP 100. The doped light barrier portion may have a different refractive index from the first light guide segments, and also have a different refractive index from the second light guide segments. A doping scheme for implementing a light barrier of a LGP according to example embodiments is described later in more detail with reference to FIG. 3A of the present application. Due to a difference in the refractive indices, the light barriers may optically separate the first light guide segments from the second light guide segments. An optical separation may be, for example, limiting (and/or preventing) light from traveling from one side to another side.

In another example, light barriers may be formed by cutting the LGP 100. In this example, the light barriers may be air gaps formed between the first light guide segments and the second light guide segments. Due to a difference between a refractive index of an empty space and a refractive index of each of the first light guide segments and the second light guide segments, the first light guide segments and the second light guide segments may be optically separated from each other. Furthermore, to guarantee the above optical separation at a higher level, at least one surface of a light barrier may be coated with a material having a reflectance equal to or greater than a threshold (e.g., a reflectance in a range of 50% to 100%, 75% to 100% and/or in a range of 90% to 100%). A cutting scheme for implementing a light barrier of a LGP according to example embodiments is described later in more detail later with reference to FIG. 3B of the present application.

In a conventional parallax barrier scheme, which may be used to provide a glasses-free 3D image, a barrier may be installed outside an FPD, and may separate a viewpoint of a left eye from a viewpoint of a right eye. Due to the barrier, an amount of light may be lost, or a resolution may be reduced when a 2D image is provided. In contract, according to example embodiments, the LGP 100 may allow a 3D image to be provided in a glasses-free mode, and may also allow a 2D image to be implemented without a need to pass through a physical parallax barrier. Thus, when a 2D image is provided, an amount of light or a resolution may not be reduced.

In addition, a 2D light guide and a 3D light guide may be patterned in a relatively simple structure in a single panel. Accordingly, it may e possible to simplify a process of manufacturing the LGP 100, which may reduce costs. Furthermore, because the light source for 2D images and the light source for 3D images may be guided in separate patterns, and the first light guide segments and second light guide segments may be arranged in the same layer, the LGP 100 may be thin. Moreover, the first light guide segments and second light guide segments may not overlap in a path along which light incident from a light source, for example a backlight unit (BLU), is guided by the LGP 100 toward a liquid crystal display (LCD) panel (for example, in a Z-axis direction). For example, when the first light guide segments guide light to provide a 2D image, the second light guide segments may not exist on a light travel path. Conversely, when the second light guide segments guide light to provide a 3D image, the first light guide segments may not exist on a light travel path. In other words, because interference in a light guide does not occur, an artifact may not appear on a screen (artifact-free), and an amount of light may not decrease. Thus, efficiency may increase. Hereinafter, examples of a structure and an operation of LGPs according to example embodiments will be further described.

Figure 2:
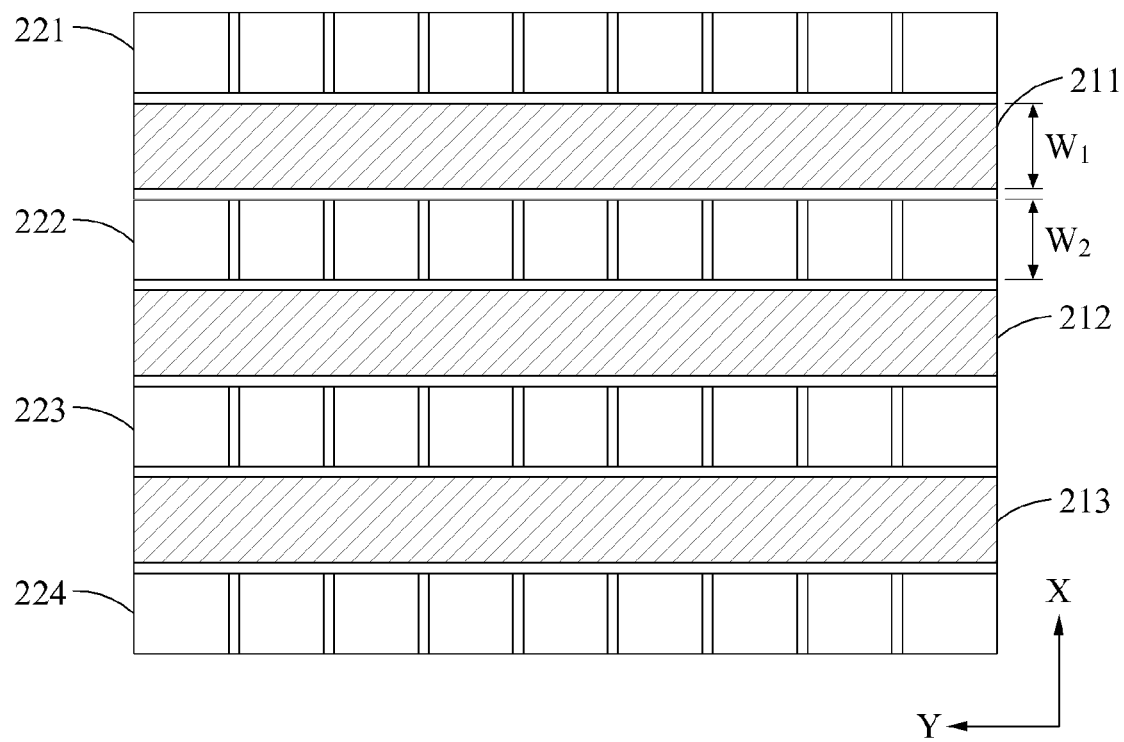
FIG. 2 is a plan view illustrating an example of an LGP according to example embodiments.

FIG. 2 is a plan view illustrating an LGP 200 according to example embodiments. In the LGP 200 of FIG. 2, first light guide segments 211, 212 and 213 associated with providing a 2D image, and second light guide segments 221, 222, 223 and 224 associated with providing a 3D image may be alternately arranged. When the LGP 200 is observed in an X-axis direction, an alternate arrangement may be verified in an order of the second light guide segment 224, the first light guide segment 213, the second light guide segment 223, the first light guide segment 212, the second light guide segment 222, the first light guide segment 211, and the second light guide segment 221. The first light guide segments 211 through 213 may be separated from the second light guide segments 221 through 224 by light barriers. Although not shown, the LGP 200 may further include light blocks to isolate the second light guide segments 221 through 224 from a first light source (not shown), and to isolate the first light guide segments 211 through 213 from a second light source (not shown). The first light source may emit light to the first light guide segments 211 through 213, to provide a 2D image. The second light source may emit light to the second light guide segment 221 through 224, to provide a 3D image.

The first light guide segments 211 through 213 and/or second light guide segments 221 through 224 may be formed of the same materials as the first light guide segments 111 and 112 and the second light guide segments 121 and 122, respectively. The first light guide segments 211 through 213 may be separated from the second light guide segments 221 through 224 by light barriers that are formed of the same material as the light barriers 131-133 described in FIG. 1. The first light guide segments 211 through 213 may guide light incident from the first light source, and may output the light as light with a stripe pattern corresponding to a Y-axis direction. The second light guide segments 221 through 224 may guide light incident from the second light source, and may output the light as light with a discontinuous pattern, for example, a square spot pattern. An anisotropic diffuser (not shown) may be disposed above the LGP 200 in a Z-axis direction, so that a desired (and/or alternatively predetermined) gap may be formed between a top of the LGP 200 and the anisotropic diffuser. The anisotropic diffuser may diffuse a light pattern in the X-axis direction. The anisotropic diffuser may be referred to as a vertical diffuser. The anisotropic diffuser may change the light with the stripe pattern guided by the first light guide segments 211 through 213 to patternless light, that is, planar light. Additionally, the anisotropic diffuser may change the light with the square spot pattern guided by the second light guide segments 221 through 224 to light with a vertical stripe pattern corresponding to the X-direction. A pattern of output light, and a change caused by the anisotropic diffusion will be further described with reference to FIGS. 4A through 5D.

In an example, a width W1 of each of the first light guide segments 211 through 213, and a width W2 of each of the second light guide segments 221 through 224 may be within a range allowing the anisotropic diffuser to diffuse light in the X-axis direction. In another example, either the width W1 or W2 may be within the range. Furthermore, the widths W1 and W2 may be identical to each other, or may be determined to have different values as occasion demands.

The dimensions (e.g., width W1, width W2, thickness of panel) of the LGP 200 may be determined depending on an application of the LGP 200. For example, if the LGP 200 is used in a display apparatus that includes an anisotropic diffuser and a panel, the dimensions of the LGP 200 may be determined depending on the vertical diffusion angle of the diffuser and the display panel size. Examples of a display apparatus including a light guide plate are described later with reference to FIGS. 8A and 8B, 9A and 9B, 10A and 10B, and 15A and 15B.

For example, as a non-limiting example, in an display apparatus including a 32 inch panel and a diffuser with a vertical diffusion angle of 40 degrees, the widths W1 and W2 may be about 700 μm each and the light barriers may have a thickness of about 100 μm.

The dimensions of the LGP 200 may depend on the display panel size. As a non-limiting example, if the LGP 200 has a width and length that are each about 1 mm to 4 mm, the widths W1 and W2 may be in the range of 500 μm to 2 mm, and the barrier thickness may be in the range of 10 to 100 μm.

Similarly, the dimensions of the LGP 100 may be the same as or similar to the dimensions of the LGP 200. For example, the widths of the first light guide segments 111 to 112 may be the same as or similar to the width W1 of the first light guide segments 211 through 213. The widths of the second light guide segments 121 to 122 may be the same as or similar to the width W2 of the second light guide segments 221 through 224. The thickness of the barrier 131 through 133 may be in range of 10 to 100 μm. However, example embodiments are not limited thereto and the dimensions of the LGP 100 and LGP 200 may vary depending on the size of a display apparatus including the LGP 100 and/or LGP 200.

Hereinafter, a structure and implementation of a light barrier to separate a first light guide segment from a second light guide segment will be further described with reference to a structure of a side of an LGP.

Figure 3A:
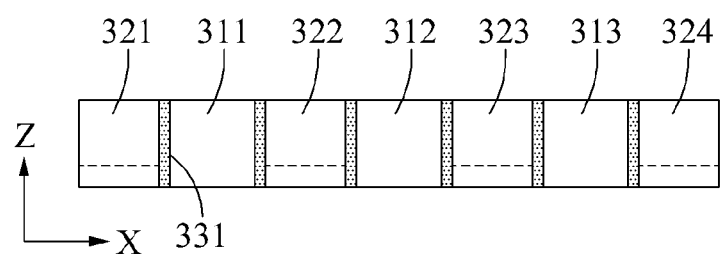
FIGS. 3A and 3B illustrate examples of a structure of a light barrier of an LGP according to example embodiments.
Figure 3B:
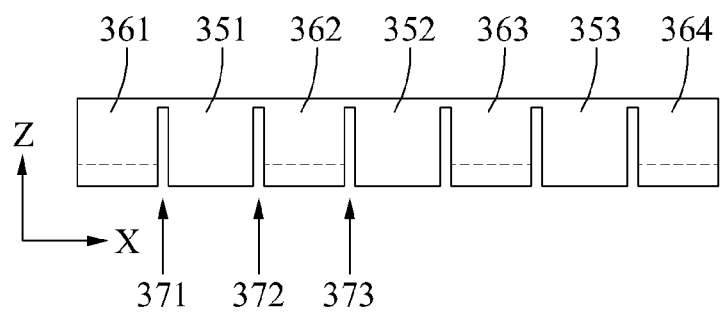

FIGS. 3A and 3B illustrate examples of a structure of a light barrier of an LGP according to example embodiments. The example of FIG. 3A may correspond to a doping scheme used to implement a light barrier. Light barriers 331 may separate first light guide segments 311, 312, and 313 from second light guide segments 321, 322, 323, and 324, and may be doped with materials having different refractive indices from the first light guide segments 311 through 313 and the second light guide segments 321 through 324. For example, the light barriers 331 may be doped with impurities, to have a refractive index higher than those of the first light guide segments 311 through 313 or the second light guide segments 321 through 324. The first light guide segments 311 through 313 and/or second light guide segments 321 through 324 may be formed of a material with high optical transmittance (e.g., PMMA or glass). If glass is used for the first light guide segments 311 through 313 and/or second light guide segments 321 through 324, then the light barriers 331 may be formed by doping impurities (e.g., Ge or P) into glass. The width of the light barriers 331 may be less than the widths of the first light guide segments 311 through 313 and/or second light guide segments 321 through 324, respectively.

The example of FIG. 3B may correspond to a cutting scheme used to implement a light barrier. In the LGP, light barriers 371, 372, and 373 may be formed by cutting between portions 351, 352, and 353 used as first light guide segments and portions 361, 362, 363, and 364 used as second light guide segments. At least a portion of the light barriers 371, 372, and 373 corresponding to empty space formed by the cutting may be coated with a material having a high refractive index or a high reflectance. The light guide plate in FIG. 3B may be formed of a material with high optical transmittance (e.g., PMMA or glass).

Figure 4A:
FIGS. 4A and 4B illustrate examples of a pattern of light output from first light guide segments before and after light passes through an anisotropic diffuser according to example embodiments.
Figure 4A:
Figure 4A:
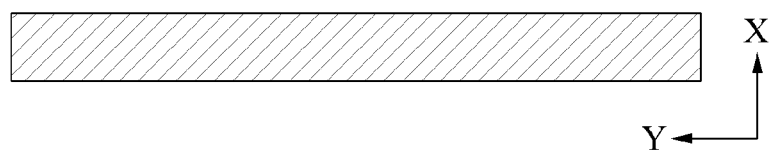
Figure 4B:
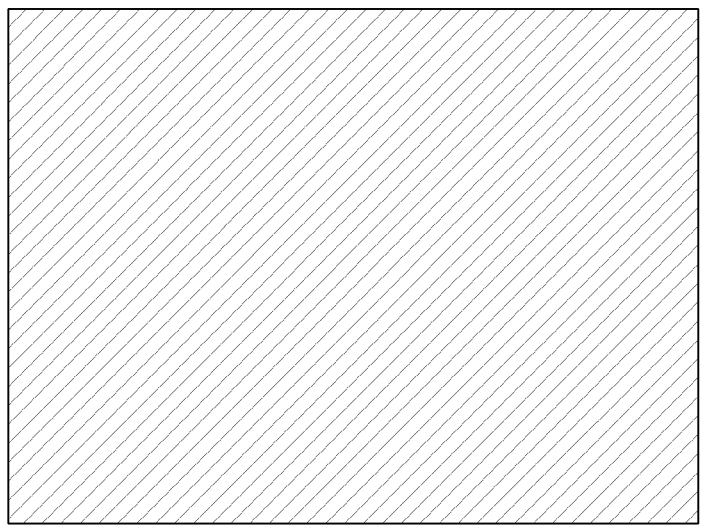

FIGS. 4A and 4B illustrate examples of a pattern of light output from first light guide segments before and after light passes through an anisotropic diffuser according to example embodiments. When a 2D image is required to be provided, light incident from a light source for 2D images to the first light guide segments 211 through 213 of FIG. 2 may be guided and output as light with a pattern 410 of FIG. 4A. The pattern 410 may be referred to as a stripe pattern corresponding to a Y-axis direction. Since light transferred to an LCD of an FPD to provide a 2D image needs to be in the form of planar light, the anisotropic diffuser may diffuse the light with the pattern 410 in an X-axis direction. Accordingly, uniform planar light 420 of FIG. 4B may be generated. When a width of a first light guide segment is designed based on a diffusion range of the anisotropic diffuser, the planar light 420 free of artifacts may be generated. When the light incident from the light source for 2D images is being guided, a light source for 3D images may be turned off. Additionally, when a problem does not occur in a generation of the planar light 420, a diffusion direction of the anisotropic diffuser may necessarily not need to be the X-axis direction. In other words, light may be anisotropically diffused in a diagonal direction that forms a desired (and/or alternatively predetermined) angle with the X-axis direction. There is no limitation to the anisotropic diffuser and accordingly, a unit capable of changing the light with the stripe pattern 410 to the planar light 420 may be used. For example, an isotropic diffuser may be used, instead of the anisotropic diffuser, in a range that has an influence on a first light guide segment, but, does not have an influence on a second light guide segment.

Figure 5A:
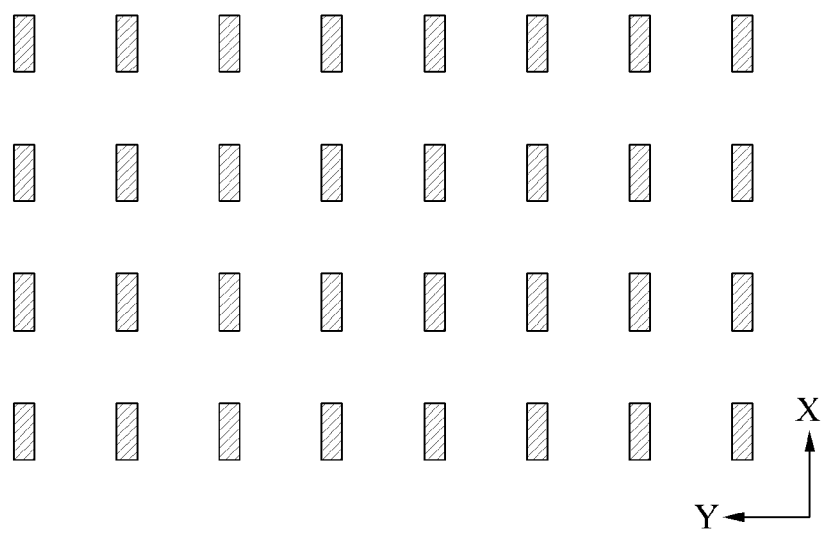
FIGS. 5A, 5B, 5C and 5D illustrate examples of a pattern of light output from second light guide segments before and after light passes through an anisotropic diffuser according to example embodiments.
Figure 5B:
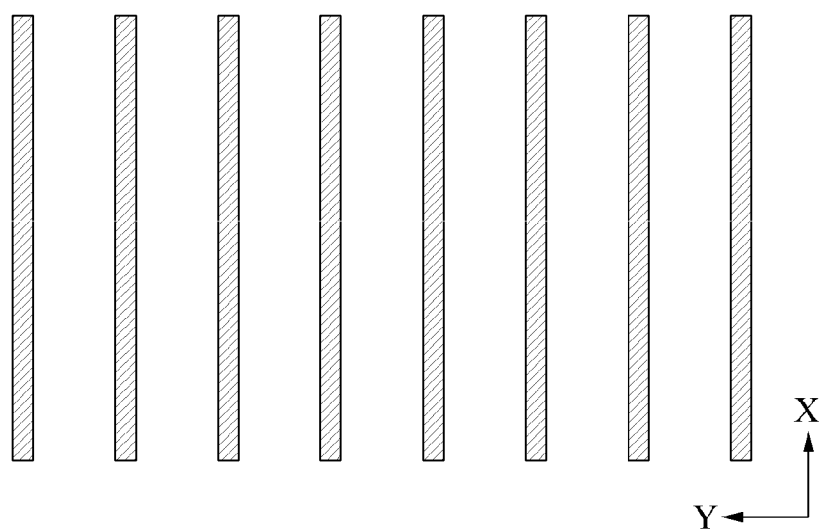
Figure 5C:
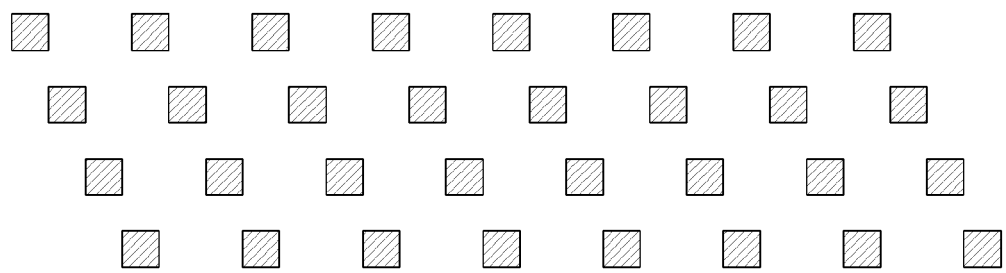
Figure 5C:
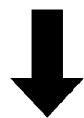
Figure 5C:
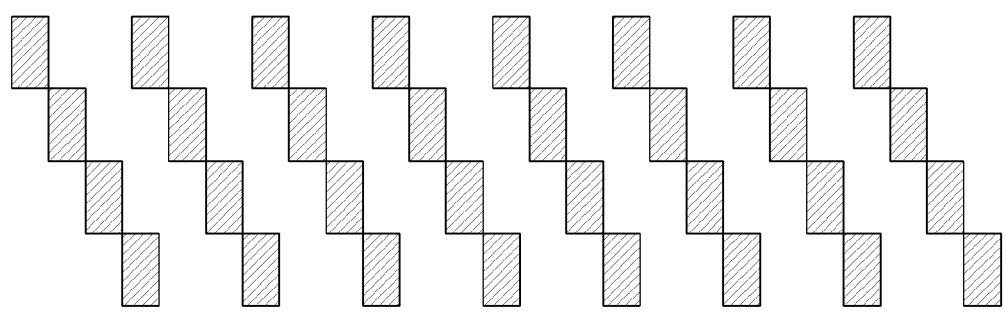

FIGS. 5A through 5D illustrate examples of a pattern of light output from second light guide segments before and after light passes through an anisotropic diffuser according to example embodiments. When a 3D image is required to be provided, light incident from a light source for 3D images to the second light guide segments 221 through 224 of FIG. 2 may be guided and output as light with a pattern 510 of FIG. 5A. The pattern 510 may be referred to as a discontinuous pattern, for example, a square spot pattern. When the anisotropic diffuser diffuses the light with the pattern 510 in an X-axis direction, a stripe pattern 520 corresponding to the X-axis direction may be generated, as shown in FIG. 5B. Through a light diffusion of the anisotropic diffuser, a gap between the second light guide segments 221 through 224 may be compensated for. Additionally, when a width of a second light guide segment is designed based on a diffusion range of the anisotropic diffuser, the stripe pattern 520 free of artifacts may be generated. The generated stripe pattern 520 may provide a directional ray pattern for a 3D image, instead of a parallax barrier that does not actually exist. When the light incident from the light source for 3D images is being guided, a light source for 2D images may be turned off.

Figure 5D:
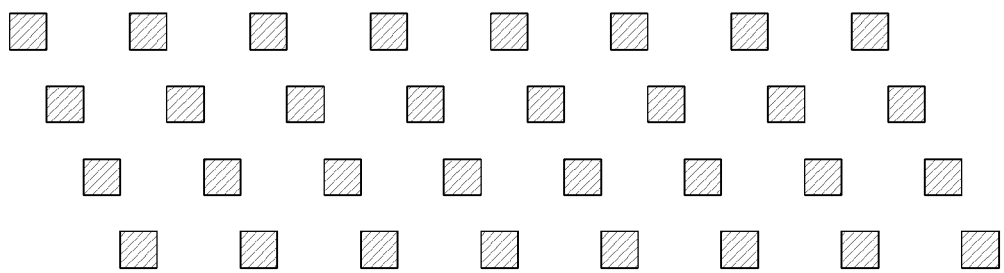
Figure 5D:
Figure 5D:
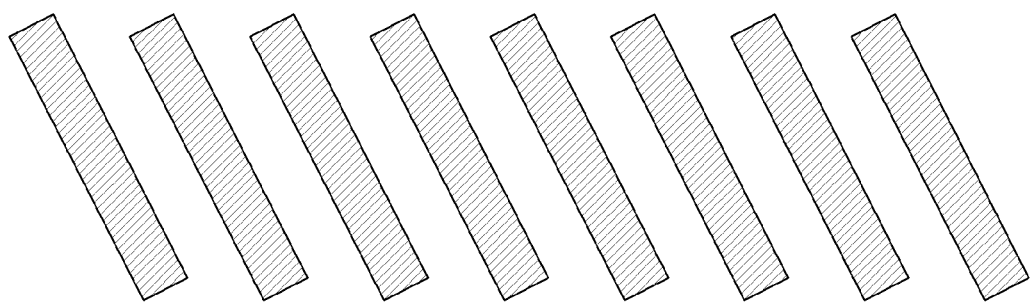

In an example, second light guide segments used to provide a 3D image may be arranged in a diagonal direction, instead of being arranged in the X-axis direction. In this example, light guided by the second light guide segments may have a pattern 530 of FIG. 5C. When a light distribution is compensated for in the X-axis direction by the anisotropic diffuser, a pattern 531 may be generated. Referring to FIG. 5D, when a diffusion direction of the anisotropic diffuser is adjusted to a diagonal direction in which second light guide segments are arranged, in a pattern 540, a pattern 541 may be generated. To provide a 3D image, the above light with the diagonal stripe pattern may be of help to increase a resolution or to efficiently arrange pixels.

Figure 6A:
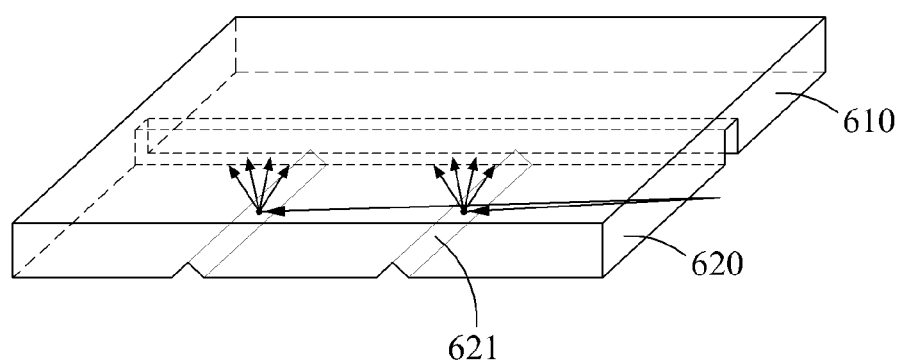
FIGS. 6A, 6B, 6C and 6D illustrate examples of a structure of a light path change pattern formed in a second light guide segment according to example embodiments.

FIGS. 6A through 6D illustrate examples of a structure of a light path change pattern formed in a second light guide segment according to example embodiments. The light path change pattern may be formed in at least a portion of the second light guide segment, and may have a physical structure to change a path of light incident from a light source for 3D images to the second light guide segment, as shown in FIG. 6A. In a light path change pattern 621 of FIG. 6A, light incident from a light source for 3D images and guided by a second light guide segment 620 may be refracted and/or reflected in various directions and accordingly, directional rays may be generated. The directional rays may selectively reach a left eye or a right eye by passing through an LCD above an LGP, to generate a 3D image. The light path change pattern 621 may not be formed in a first light guide segment 610.

Figure 6B:
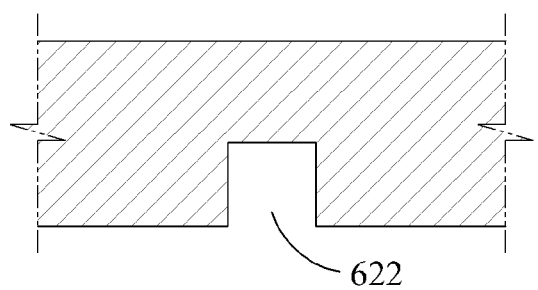
Figure 6C:
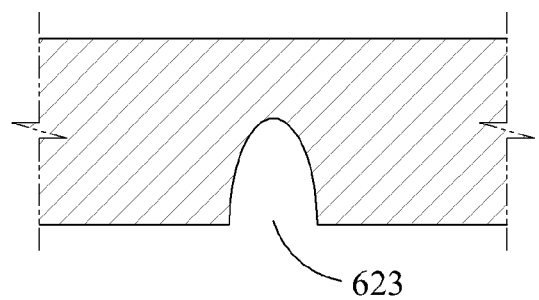
Figure 6D:
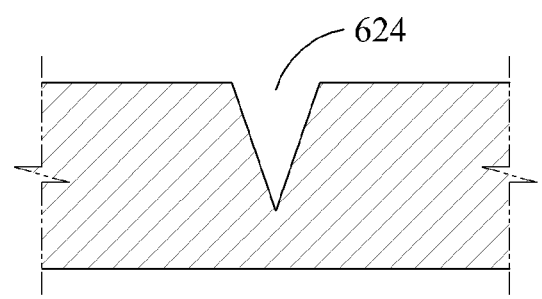

According to example embodiments, a width of a repeated pattern, a shape, or a structure of the above light path change pattern may be variously modified and designed. FIGS. 6B through 6D are cross-sectional diagrams of an LGP, to describe a structure of a light path change pattern. Referring to FIG. 6B, a light path change pattern 622 in an LGP may have a rectangular cross section. Light may be incident from a light source for 3D images to the LGP, and may travel in the rectangular cross section in various directions, and accordingly directional rays traveling in various directions may be generated as shown in FIG. 6A. Referring to FIG. 6C, a light path change pattern 623 in an LGP may have an oval shape. Referring to FIG. 6D, a cross section of a light path change pattern 624 in an LGP may correspond to an inverted triangle. Directional rays traveling in various directions may be generated by guiding light emitted from a light source for 3D images, as shown in FIG. 6A, and accordingly a light path change pattern may have various shapes. In other words, there is no limitation to the above examples of the structure of the light path change pattern. In FIG. 6A, the first light guide segment 610 and the second light guide segment 620 may have different structures. For example, the light path change pattern 621 may be formed in only the second light guide segment 620.

The pitch between the light path change patterns (e.g., 621 to 624) may be adjusted depending on the number of view images of a 3D display and the pixel size of the display panel. The width of the light path change patterns (e.g., 621 to 624) may be set on the pixel size. For example, the width of the light path change patterns (e.g., 621 to 624) may be about 20 to 30% of the pixel size. In the case of a 32 inch panel, the width the light path change patterns (e.g., 621 to 624) may be about 40 to 50 µm, but example embodiments are not limited thereto. The height of the light path change patterns (e.g., 621 to 624) may be less than the thickness of the light guide plate. For example, in the case of a 1 mm to 4 mm thick light guide plate, the height of the light change patterns (e.g., 621 to 624) may be about 40 to 100 µm, but example embodiments are not limited thereto.

In example embodiments, the light path change patterns (e.g., 621 to 624) described above in FIGS. 6A to 6B may be formed in the second light guide segments of any of the LGPs described above in FIGS. 1, 2, 3A, and 3B. In another example, there may be no difference in structure between a first light guide segment and a second light guide segment, which will be described below.

Figure 7A:
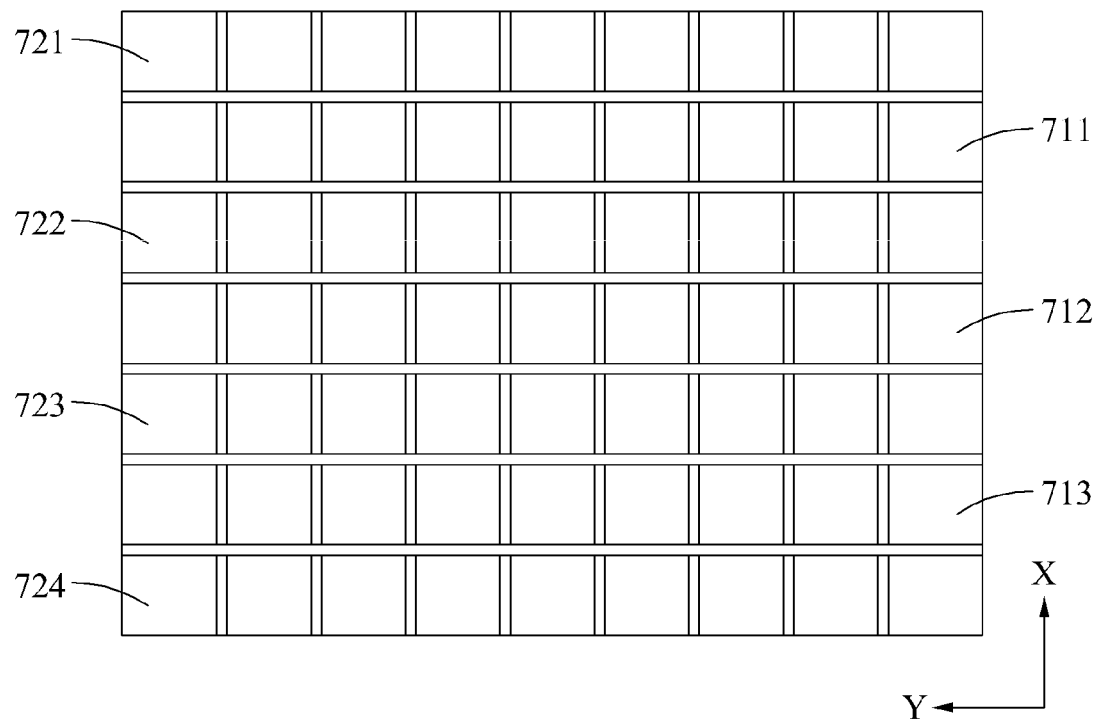
FIGS. 7A, 7B and 7C are plan views illustrating another example of an LGP and examples of a diffuser according to example embodiments.

FIG. 7A is a plan view illustrating an LGP according to example embodiments. In FIG. 7A, first light guide segments 711, 712 and 713 associated with providing of a 2D image, and second light guide segments 721, 722, 723 and 724 associated with providing of a 3D image may not be structurally distinguished from each other. The first light guide segments 711 through 713 and/or second light guide segments 721 through 724 may be formed of a material with high optical transmittance (e.g., PMMA or glass).

A structure of the LGP of FIG. 7A may be simple in terms of at least a complexity or operations of a process, in comparison to the LGP 200 of FIG. 2. For example, light path change patterns may be processed in an X-axis direction on a panel used to form an LGP, and light barriers may be cut in a Y-axis direction, to manufacture the LGP. Light guide segments may not be structurally distinguished from each other, however, may be divided into first light guide segments and second light guide segments, based on an arrangement of a light source for 2D images and a light source for 3D images, and based on a structure of an anisotropic diffuser disposed above an LGP. Additionally, a first anisotropic diffuser and a second anisotropic diffuser may be separately disposed above the LGP, and may have different structures.

Figure 7B:
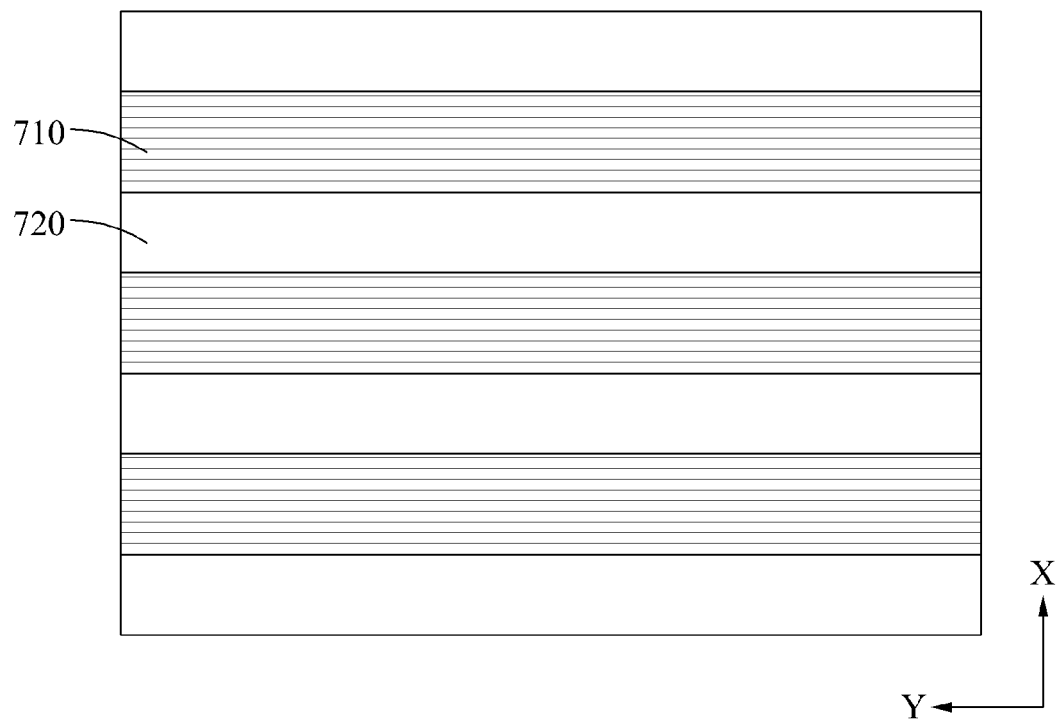
Figure 7C:
Figure 7D:
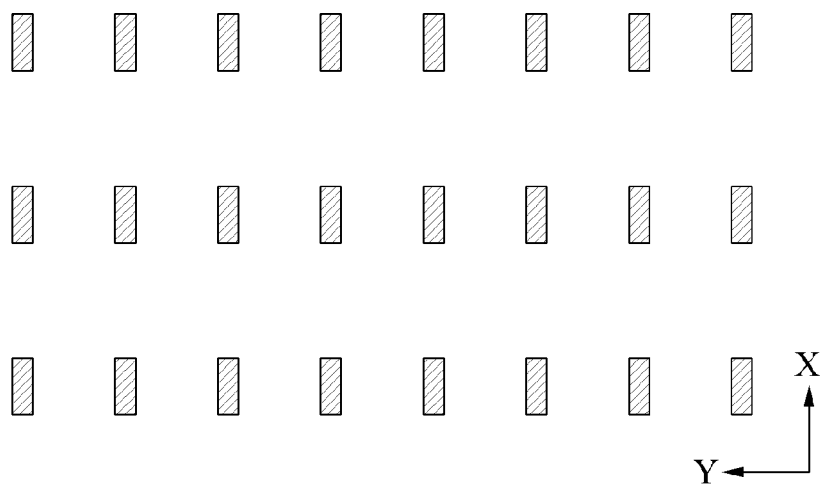
Figure 7D:
Figure 7F:
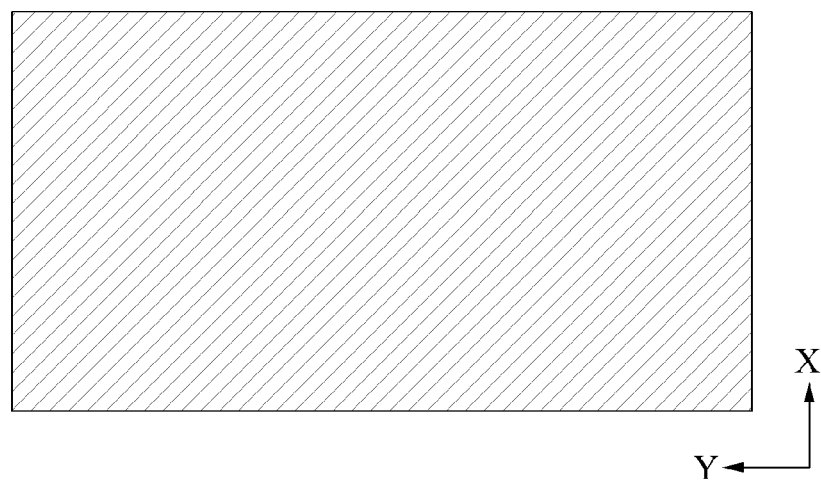

FIGS. 7B and 7C illustrate a first anisotropic diffuser and a second anisotropic diffuser, respectively, according to example embodiments. FIGS. 7D, 7E and 7F illustrate a process in which a pattern of light output from a first light guide segment is changed when the light passes through a first anisotropic diffuser and a second anisotropic diffuser according to example embodiments.

For example, the first light guide segments 711 through 713 may guide light incident from a first light source (not shown) used to provide a 2D image, and may output the light as light with a discontinuous pattern, for example, a square spot pattern 730 of FIG. 7D. In this example, the first anisotropic diffuser of FIG. 7B may diffuse the light with the square spot pattern 730 in the Y-axis direction, and may change the light with the square spot pattern 730 to light with a stripe pattern 740 corresponding to the Y-axis direction.

Referring to FIG. 7B, the first anisotropic diffuser manufactured as a single thin panel or film may include a first region 710 disposed above the first light guide segments 711 through 713, and a second region 720 disposed above the second light guide segments 721 through 724. The first region 710 may be manufactured to perform an anisotropic diffusion in the Y-axis direction, and the second region 720 may be manufactured to allow light to pass through the first anisotropic diffuser, instead of diffusing the light.

For example, in the first anisotropic diffuser, the first region 710 may be selectively disposed above the first light guide segments 711 through 713, and another structure may not be disposed above the second light guide segments 721 through 724. In this example, the second region 720 may not exist, and first regions 710 may be discontinuously disposed.

The stripe pattern 740 as a result of light that is guided by the LGP and that passes through the first anisotropic diffuser may be similar to the pattern 410 of FIG. 4A. In other words, the same result may be expected based on an arrangement of an anisotropic diffuser, and a setting of a diffusion direction, instead of based on a structure of an LGP. Referring to FIG. 7C, the second anisotropic diffuser may have an anisotropic diffusion characteristic in the X-axis direction, and may be disposed above the first anisotropic diffuser. In addition, the light with the stripe pattern 740 generated by the first anisotropic diffuser may be changed by the second anisotropic diffuser of FIG. 7C to patternless light, for example, planar light 750, as shown in FIG. 7F of the present application.

When a 3D image is required to be provided, light may be incident from a second light source (not shown) to the second light guide segments 721 through 724. The second light guide segments 721 through 724 may guide the light, and may output the light as light with a discontinuous pattern, for example, a square spot pattern. For example, the same pattern as the pattern 510 of FIG. 5A may be generated. The square spot pattern may be changed to a stripe pattern corresponding to the X-axis direction through a diffusion of the light in the X-axis direction by the second anisotropic diffuser, instead of being modified by the first anisotropic diffuser as described above. The stripe pattern may be identical to the stripe pattern 520 of FIG. 5B. The examples of the structure of the LGP and the examples of the patterns of output light have been described above.

Figure 7G:
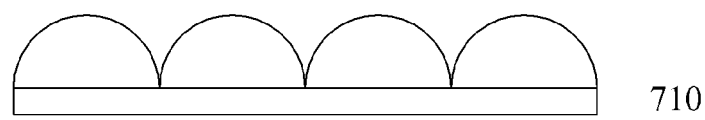
FIG. 7G illustrates a sectional view of examples of the first region and the second region in the first anisotropic diffuser of FIG. 7B according to example embodiments.
Figure 7G:
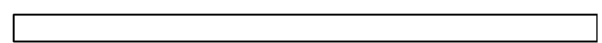

FIG. 7G illustrates a sectional view of examples of the first region 710 and the second region 720 in first anisotropic diffuser of FIG. 7B according to example embodiments. Referring to FIG. 7G, an array of holographic micropatterns or microlenticular lens may be formed on the first region 710, but not the second region 720. The array of holographic micropatterns or microlenticular lens may be used to diffuse the light.

Hereinafter, examples of a display apparatus including an LGP configured as described above will be further described.

Figure 8A:
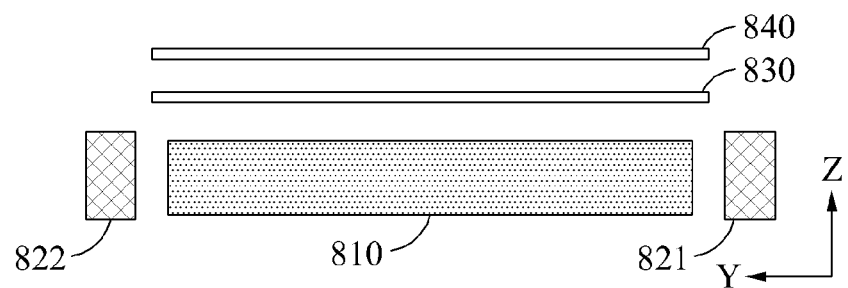
FIGS. 8A and 8B illustrate an example of a display apparatus according to example embodiments.
Figure 8B:
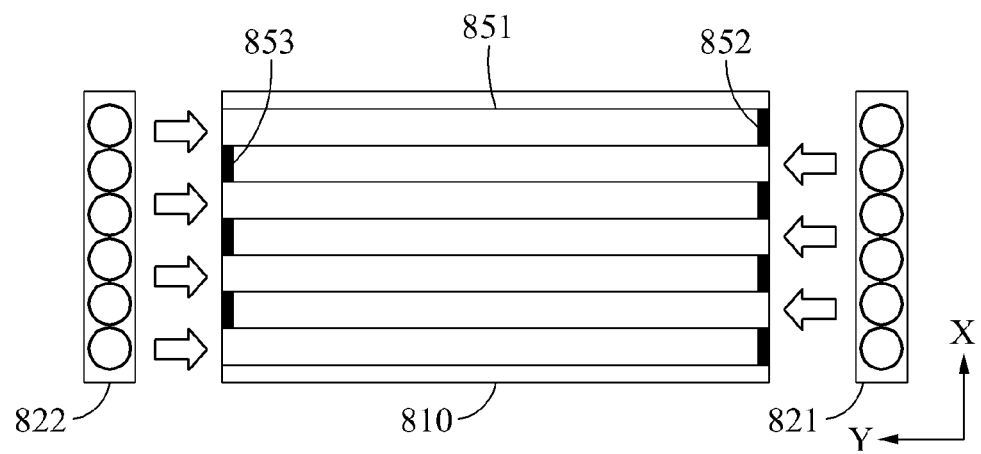

FIGS. 8A and 8B illustrate a side diagram and a plan view of an example of a display apparatus according to example embodiments, respectively. A first light source 821 used to provide a 2D image may be disposed in one side of an LGP 810, and a second light source 822 used to provide a 3D image may be disposed in another side of the LGP 810. The first light source 821 and the second light source 822 may face each other. The LGP 810 may have, for example, various structures described above with reference to FIGS. 1, 2, and 7A through 7D. An anisotropic diffuser 830 may be disposed above the LGP 810 in a Z-axis direction, and an LCD panel 840 may be disposed above the anisotropic diffuser 830 and accordingly, a display apparatus may be implemented.

Based on selection information regarding whether a 2D image or a 3D image is to be provided, the first light source 821 and the second light source 822 may be selectively turned on. Referring to FIG. 8B, when the first light source 821 allows light to be incident to the LGP 810, a light block 852 may reduce (and/or block) a portion of the light, so that the light may be incident to only 2D light guide segments. When light emitted from the second light source 822 is incident to the LGP 810, a light block 853 may selectively reduce (and/or block) a portion of the light, so that the light may be incident to only 3D light guide segments. The light blocks 852 and 853, together with a light barrier 851, may separate light guide paths. Additionally, in the 3D light guide segments, a path of the light emitted from the second light source 822 may be changed by a light path change pattern as shown in FIG. 6A. A process of providing a 2D light pattern and a 3D light pattern based on the above structure has been described above with reference to FIGS. 4A through 5D. The light blocks 852 and/or 853 may be formed of Ag, Au, or black materials, but example materials are not limited thereto.

A shape of a light incident portion may be modified to various shapes and may be applied, to effectively focus 2D light or 3D light and simultaneously to effectively separate a 2D light path from a 3D light path. For example, the light incident portion may be disposed in the form of a triangle, or a light condenser lens may be inserted and accordingly, the light incident portion may simultaneously function as the light blocks 852 and 853. A structure of the light incident portion may be variously modified so that the light emitted from the first light source 821 and the second light source 822 may be effectively incident to the LGP 810.

Figure 9A:
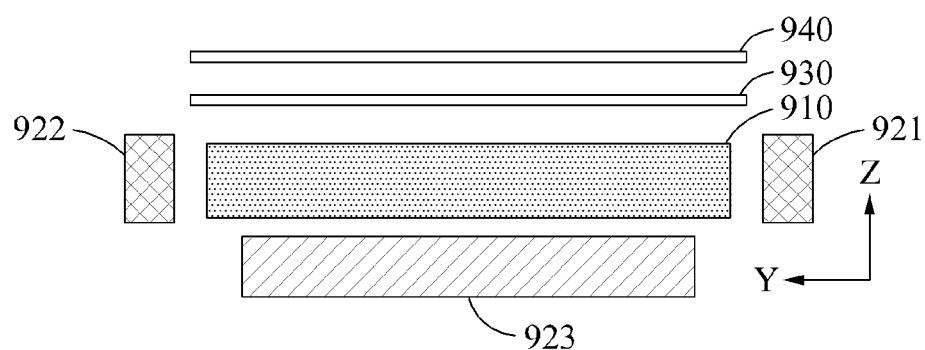
FIGS. 9A and 9B illustrate another example of a display apparatus according to example embodiments.
Figure 9B:
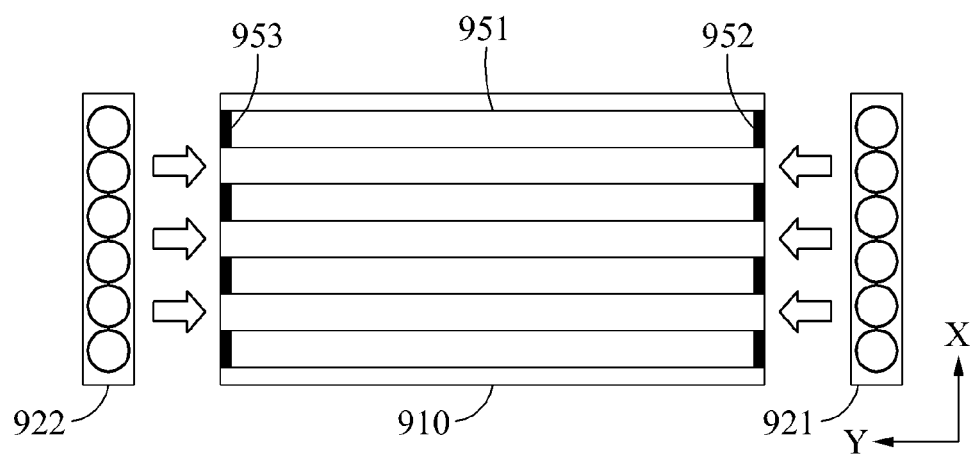

FIGS. 9A and 9B illustrate a side diagram and a plan view of another example of a display apparatus according to example embodiments, respectively. The display apparatus of FIG. 9A may be different from the display apparatus of FIG. 8A in an arrangement of light sources. Referring to FIG. 9A, first light sources 921 and 922 used to provide a 2D image may be disposed in both sides of an LGP 910, and a second light source 923 used to provide a 3D image may be disposed below the LGP 910. It will be understood that edge-type BLUs are included as 2D light sources, and that direct-type BLUs are included as 3D light sources. In an edge-type BLU, LED lights may be aligned in the edge of the LGP 910. For example, FIG. 9A illustrates the first light sources 921 and 922 are aligned with the edge of the LGP 910. In a direct-type BLU, the LED lights may be arranged in the to back one non-edge surface (e.g., bottom surface) of the LGP 910. For example, FIG. 9A illustrates the second light source 923 faces a non-edge surface of the LGP 910. The LGP 910, an anisotropic diffuser 930 and an LCD panel 940 may be arranged in the same structure as the structure of FIG. 8A.

Referring to FIG. 9B, light blocks 952 and 953 may be arranged in a different structure from the light blocks 852 and 853 of FIG. 8B. The blocks 952 and 953 may allow light emitted from the first light sources 921 and 922 in both sides of the LGP 910 to be incident to first light guide segments, and may limit (and/or prevent) the light from being incident to second light guide segments. Light emitted from the second light source 923 disposed as a BLU below the LGP 910 may need to be limited (and/or prevented) from being incident to the first light guide segments and accordingly, bottom surfaces of the first light guide segments may be blocked by other light blocks, although not shown. By the light blocks 952 and 953, and a light barrier 951, light patterns in the examples of FIGS. 4A through 5D may be provided. For example, in the structure of the display apparatus of FIGS. 8A and 8B, 3D light incident from a side of the LGP 810 may be changed to directional rays by the light path change pattern of FIG. 6A. In the structure of the display apparatus of FIGS. 9A and 9B, 3D light may be incident from a bottom of the LGP 910 in light path change patterns, and may be changed to directional rays. The light path change pattern and the structure in FIGS. 8A and 8B may not need to be changed. When only a light incidence angle is changed in the structures of FIGS. 6A through 6D, the same pattern of light guided and output by an LGP may be generated. In this example, the second light source 923 disposed blow the LGP 910 and configured to allow light to be incident to the second light guide segments, may allow directional light having a desired (and/or alternatively predetermined) direction and a desired (and/or alternatively predetermined) angle to be incident in a light path change pattern. In another example, the second light source 923 may allow planar light to be incident. In this example, slit barriers (not shown) may be disposed between the second light source 923 and the LGP 910. The slit barriers may be arranged alternately one after another, corresponding to the first light guide segments and the second light guide segments.

Figure 10A:
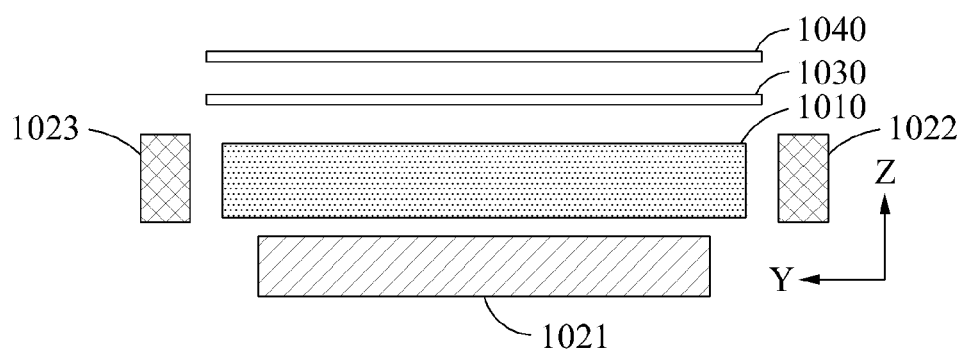
FIGS. 10A and 10B illustrate still another example of a display apparatus according to example embodiments.
Figure 10B:
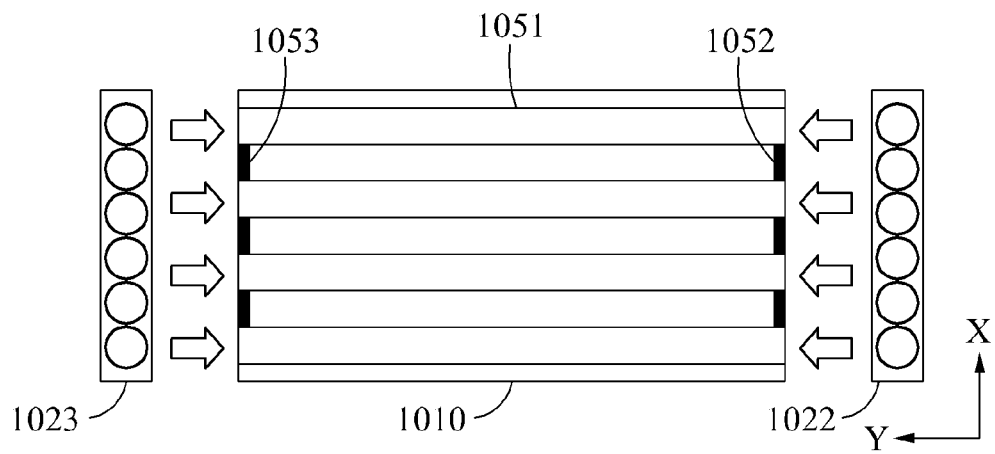

FIGS. 10A and 10B illustrate a side diagram and a plan view of still another example of a display apparatus according to example embodiments, respectively. A position of a first light source 1021, and positions of second light sources 1022 and 1023 may be opposite to positions of the first light sources 921 and 922 and a position of the second light source 923 of FIGS. 9A and 9B. Referring to FIG. 10A, the second light sources 1022 and 1023 may be disposed in both sides of an LGP 1010, and the first light source 1021 may be disposed below the LGP 1010. The first light source 1021 may be used to provide a 2D image, and the second light sources 1022 and 1023 may be used to provide a 3D image. Unlike the example of FIGS. 9A and 9B, it will be understood that edge-type BLUs are included as 3D light sources, and that direct-type BLUs are included as 2D light sources. The LGP 1010, an anisotropic diffuser 1030 and an LCD panel 1040 may be arranged in the same structure as the structure of FIG. 8A.

Referring to FIG. 10B, light blocks 1052 and 1053 may be used to limit (and/or prevent) light from being incident to first light guide segments, unlike the example of FIG. 9B. The light blocks 1052 and 1053 may allow light emitted from the second light sources 1022 and 1023 in both sides of the LGP 1010 to be incident to second light guide segments, and may limit (and/or prevent) the light from being incident to the first light guide segments. Light emitted from the first light source 1021 disposed as a BLU below the LGP 1010 may need to be limited (and/or prevented) from being incident to the second light guide segments and accordingly, bottom surfaces of the second light guide segments may be blocked by other light blocks, although not shown. By the light blocks 1052 and 1053, and a light barrier 1051, light patterns in the examples of FIGS. 4A through 5D may be provided.

Figure 11:
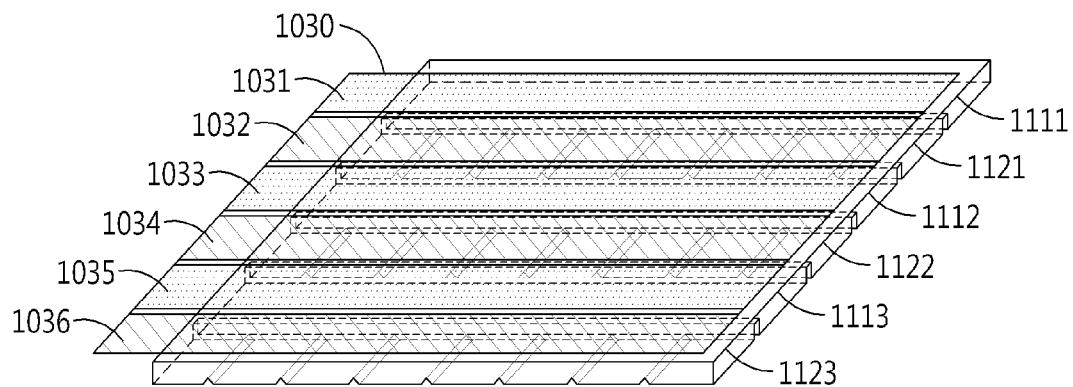
FIG. 11 illustrates an example of an LGP and a diffuser according to example embodiments.

FIG. 11 illustrates an example of an LGP and a diffuser according to example embodiments. In the LGP, first light guide segments 1111, 1112, and 1113, and second light guide segments 1121, 1122, and 1123 may be alternately arranged. A first light source (not shown) may provide light used to provide a 2D image, and the light may be guided by the first light guide segments 1111 through 1113. Also, a second light source (not shown) may provide light used to provide a 3D image, and the light may be guided by the second light guide segments 1121 through 1123. The first light guide segments 1111 through 1113, and the second light guide segments 1121 through 1123 may be optically separated from each other by light barriers. The LGP may have various structures. In an example, as described above with reference to FIGS. 1 and 2, the first light guide segments 1111 through 1113 may have different structures from the second light guide segments 1121 through 1123. In another example, as described above with reference to FIG. 7A, the first light guide segments 1111 through 1113 and the second light guide segments 1121 through 1123 may have the same structure.

A structure of a diffuser 1030 may be different from the above-described examples. The diffuser 1030 may be, for example, a film or a panel, and may be divided into two regions, for example, first regions 1031, 1033, and 1035, and second regions 1032, 1034, and 1036. The first regions 1031, 1033, and 1035 may be disposed above the first light guide segments 1111, 1112, and 1113, respectively. The second regions 1032, 1034, and 1036 may be disposed above the second light guide segments 1121, 1122, and 1123, respectively. In FIG. 11, the first regions 1031, 1033, and 1035 may have isotropic diffusion characteristics, and the second regions 1032, 1034, and 1036 may have anisotropic diffusion characteristics. Accordingly, when light with a stripe pattern or a square spot pattern is formed in the first light guide segments 1111 through 1113, to provide a 2D image, the light may be isotropically diffused in the first regions 1031, 1033, and 1035, and may be modified to planar light. Additionally, when a square spot pattern of light is formed in the second light guide segments 1121 through 1123, to provide a 3D image, the light may be anisotropically, that is, vertically diffused in the second regions 1032, 1034, and 1036, and may be modified to light with a vertical stripe pattern. Because light provided by the first light guide segments 1111 through 1113 only needs to be modified to planar light in order to provide a 2D image, the first regions 1031, 1033, and 1035 disposed above the first light guide segments 1111 through 1113 may not need to have anisotropic diffusion characteristics, and may have isotropic diffusion characteristics. However, light may need to be anisotropically diffused in the second regions 1032, 1034, and 1036 disposed above the second light guide segments 1121 through 1123 in order to provide a 3D image. Accordingly, the diffuser 1030 that is in the form of a single film or a panel and in which the first regions 1031, 1033, and 1035 having the isotropic diffusion characteristics, and the second regions 1032, 1034, and 1036 having the anisotropic diffusion characteristics are alternately arranged, may be used. The diffuser 1030 may correspond to a single film or panel wherein the first anisotropic diffuser of FIG. 7B is implemented in a divided area and the second anisotropic diffuser of FIG. 7C is implemented in another divided area of the single film or panel.

Figure 12:
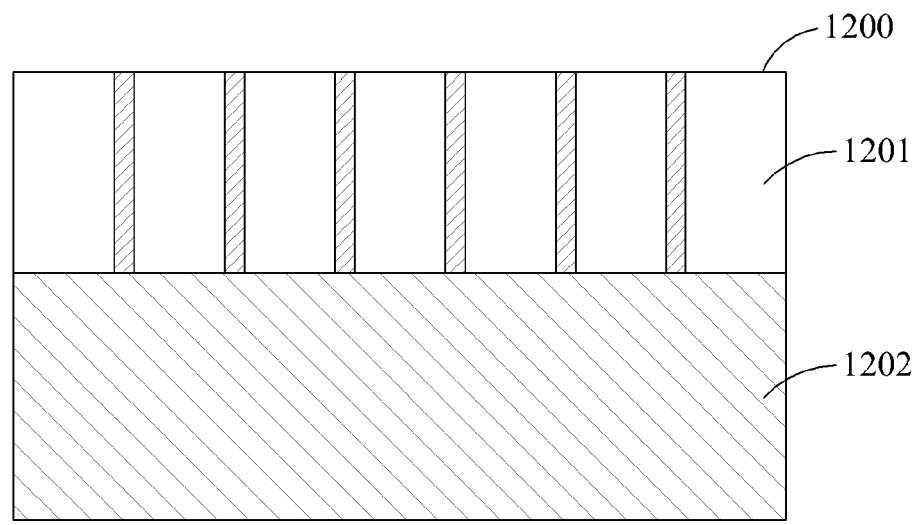
FIG. 12 illustrates a pattern of light output from an LGP to simultaneously provide a two-dimensional (2D) image and a three-dimensional (3D) image through a division of a screen according to example embodiments.

FIG. 12 illustrates a pattern of light output from an LGP to simultaneously provide a 2D image and a 3D image through a division of a screen according to example embodiments. In FIG. 12, a pattern 1200 may be generated by an LGP and an anisotropic diffuser, and may be divided into a plurality of regions, for example, regions 1201 and 1202. The LGP may have one of the structures of FIGS. 1 and 7A. In response to a requirement to simultaneously provide a 2D image and a 3D image, a 3D mode may be performed in a portion of the LGP corresponding to the region 1201, and a 2D mode may be performed in a portion of the LGP corresponding to the region 1202. For example, when a 3D light source is turned on and when a 2D light source is turned off, light incident from the 3D light source to second light guide segments may correspond to the region 1201. In this example, directional rays included in the region 1201 may provide a 3D image by passing through an LCD (not shown). In another example, when the 2D light source is turned on, and when the 3D light source is turned off, light incident from the 2D light source to first light guide segments may be planar light corresponding to the region 1202. In this example, the planar light may provide a 2D image by passing through the LCD. In the above configuration, light may be vertically diffused using an anisotropic diffuser, as described above, or the anisotropic diffuser may not be required when regions for 2D implementation and 3D implementation are arranged by excluding a mutual interference between the regions. Various schemes may be used to divide a pattern into regions, and that a division of an arbitrary shape is possible when a light source is controllable.

Figure 13:
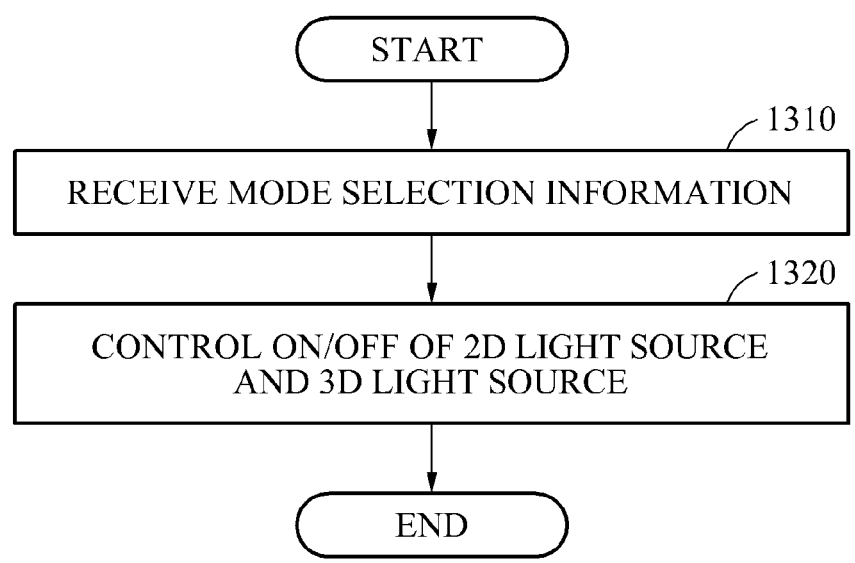
FIG. 13 illustrates an operating method of a display apparatus according to example embodiments.

FIG. 13 illustrates an operating method of a display apparatus according to example embodiments. The display apparatus may have an arbitrary structure among the structures described above with reference to FIGS. 8A through 12. Referring to FIG. 13, when mode selection information on a selection of a 2D mode or a 3D mode is received in operation 1310, the display apparatus may control a 2D light source and a 3D light source to be turned on or off, based on the mode selection information in operation 1320. In operation 1320, to provide a 2D image, the 2D light source may be turned on and the 3D light source may be turned off. To provide a 3D image, the 3D light source may be turned on and the 2D light source may be turned off. As described above with reference to FIG. 12, the 2D image and the 3D image may be simultaneously provided. In response to a requirement to simultaneously provide a 2D image and a 3D image, a 2D light source may be turned on in a region, and a 3D light source may be turned on in another region.

Figure 14:
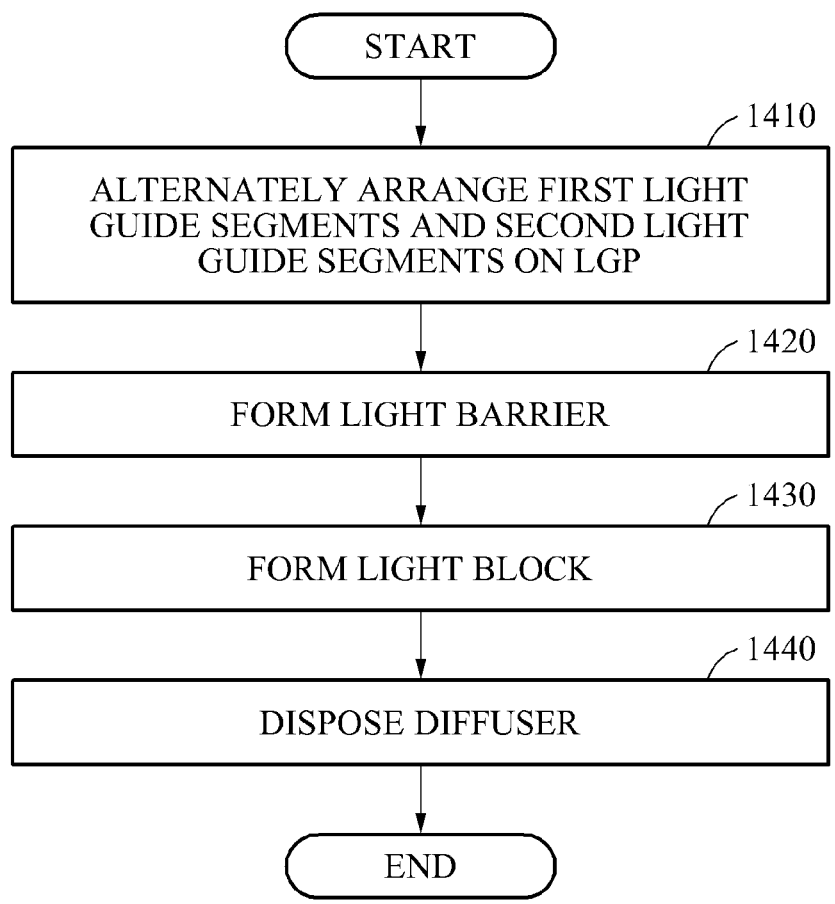
FIG. 14 illustrates a method of manufacturing a display apparatus according to example embodiments.

FIG. 14 illustrates a method of manufacturing a display apparatus according to example embodiments.

Referring to FIG. 14, in operation 1410, first light guide segments and second light guide segments may be alternately arranged on a panel used to form an LGP. Structures of the first light guide segments and the second light guide segments that are alternately arranged have been described above with reference to FIGS. 2, 3 and 7A. In operation 1410, a light path change pattern may be formed in the second light guide segments. In the example of FIG. 7A, the first light guide segments 711 through 713 and the second light guide segments 721 through 724 may not be substantially structurally distinguished from each other through operation 1410. In operation 1420, a light barrier may be formed. The light barrier may be formed as described above with reference to FIGS. 3A and 3B. In an example, the light barrier may be doped with impurities, so that a refractive index of the light barrier may be different from a refractive index of an LGP. The light barrier may be doped with impurities using an ion-implantation process. In another example, the light barrier may be formed by a cutting process scheme. At least a portion of the light barrier may be coated with a material having a high refractive index or a high reflectance.

In operation 1430, a light block may be formed. A position of the light block may be determined based on a position of a light source, in the examples of an arrangement of a 2D light source and a 3D light source described above with reference to FIGS. 8A through 10B. For example, the light block may be formed to allow light emitted from the 2D light source to be incident to only a 2D light guide segment and to limit (and/or prevent) the light from being incident to a 3D light guide segment. Also, the light block may be formed to allow light emitted from the 3D light source to be incident to only a 3D light guide segment and to limit (and/or prevent) the light from being incident to a 2D light guide segment. The light block may be coated with a material having a low transmissivity, and may be formed using a chemical vapor deposition process, spray coating process, or a painting process, but example embodiments are not limited thereto. In operation 1440, a diffuser may be disposed above the LGP so that an appropriate gap may be formed between the LGP and the diffuser. Thus, the display apparatus may be manufactured. An order of operations 1410 through 1440 may be changed for an efficiency or convenience of a manufacturing process. In addition, an operation may be merged with another operation, and the operations may be performed all at once. Furthermore, depending on interpretation, a desired (and/or alternatively predetermined) operation may be omitted. For example, when a light barrier is formed in an LGP using a cutting process scheme, light guide segments may be distinguished in operation 1420, as described above with reference to FIG. 3B. Thus, it will be understood that operation 1410 may be omitted, or that operations 1410 and 1420 may be performed together.

FIGS. 15A to 15D illustrate a display apparatus according to example embodiments.

In FIGS. 15A to 15D, the light sources 1521 and 1522, light guide plate 1510, diffuser 1530, and LCD panel 1540 may be similar to the corresponding structures in FIGS. 8A and 8B. For example, the display apparatus in FIG. 15A may include a first light source 1521 and a second light source 1522. The first light source 1521 may be used to provide a 2D image and may be disposed at one side of an LGP 1510. The second light source 1522 may be used to provide a 3D image and may be disposed at another side of the LGP 1510. The first light source 1521 and the second light source 1522 may face each other. The LGP 1510 may have, for example, various structures described above with reference to FIGS. 1, 2, and 7A through 7D. An anisotropic diffuser 1530 may be disposed above the LGP 1510 in a Z-axis direction, and an LCD panel 1540 may be disposed above the anisotropic diffuser 1530 and accordingly, a display apparatus may be implemented.

Figure 15A:
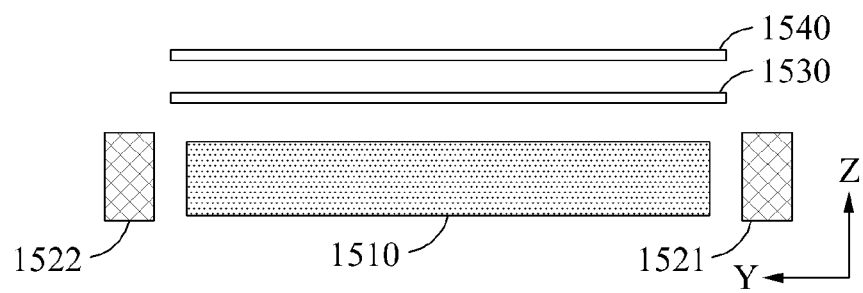
FIGS. 15A to 15D illustrate a display apparatus according to example embodiments.
Figure 15B:
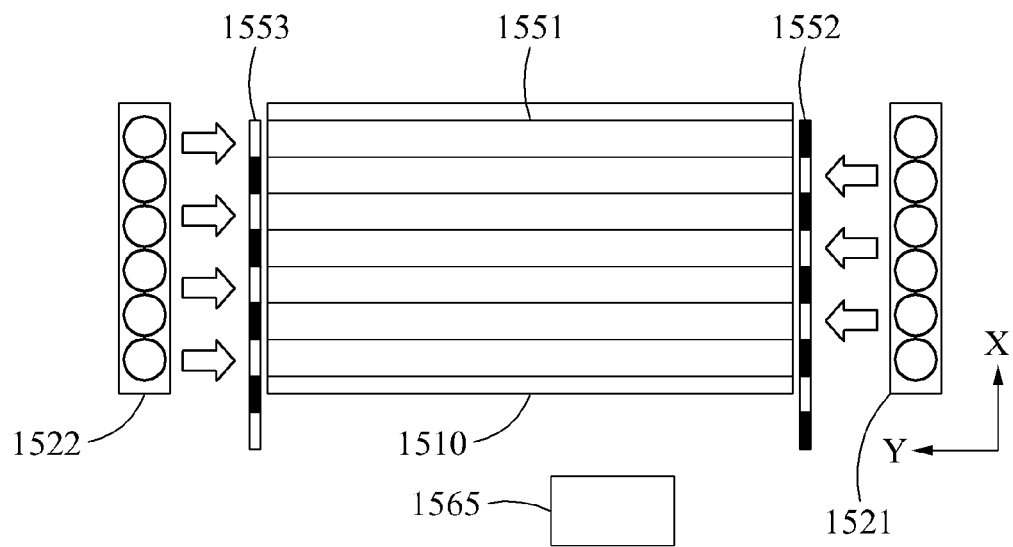

Unlike the display apparatus in FIGS. 8A and 8B, FIG. 15B shows the light blocks 1552 and 1553 may be outside of the light guide plate 1510. The light blocks 1552 and 153 may be moved using a driving unit 1565. The driving unit 1565 may be a circuit for adjusting the positions of the light blocks 1552 and 1553 relative to the LGP 1510.

The light blocks 1552 and 1553, together with a light barrier 1551, may separate light guide paths. FIG. 15B shows a mode where the light block 1553 blocks a portion of the second light source 1522 so the second light source 1522 is incident only to 3D light guide segments and the light block 1552 blocks a portion of the first light source 1521 so the first light source 1521 is incident only to 2D light guide segments.

Figure 15C:
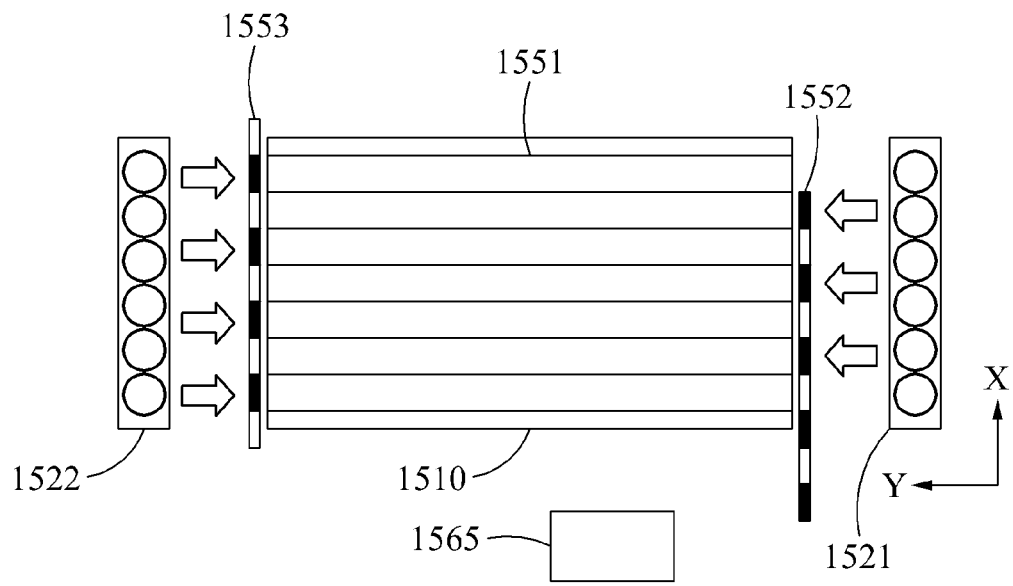

In FIG. 15C, the driving unit 1565 may adjust the positions of the light blocks 1552 and 1553 so the first light source 1521 is incident to 3D light guide segments and the second light source 1522 is incident to 2D light guide segments.

Figure 15D:
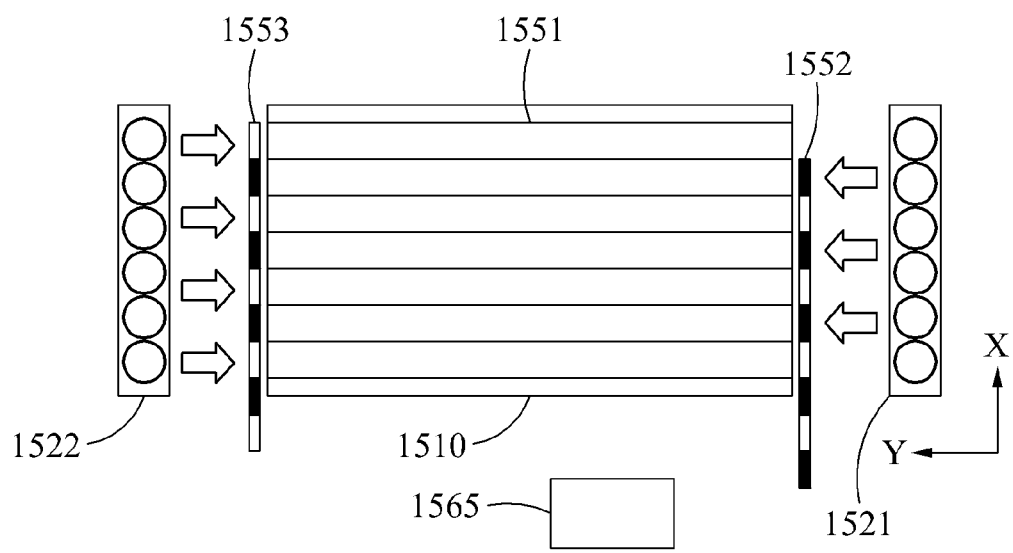

In FIG. 15D, both light sources 1521-1522 may be incident to the same light guide segments (e.g., 2D or 3D) so the intensity may be greater in 2D or 3D only operation.

In example embodiments, a television, monitor, tablet, mobile device and/or digital information display application may use one of the above-described display apparatuses according to example embodiments.

A number of example embodiments have been described above. It should be understood that example embodiments described herein should be considered in a descriptive sense only and not for purposes of limitation. It should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, while some example embodiments have been particularly shown and described, it will be understood by one of ordinary skill in the art that variations in form and detail may be made therein without departing from the spirit and scope of the claims.

What is claimed is:

1. A light guide plate (LGP) comprising:
a first light guide segment and a second light guide segment alternately arranged in a first direction,
the first light guide segment being configured to guide light incident from a first light source used to generate a two-dimensional (2D) image without guiding light from a second light source used to generate a three-dimensional (3D) image, and
the second light guide segment being configured to guide light incident from the second light source used to generate a three-dimensional (3D) image without guiding the light incident from the first light source.

2. The LGP of claim 1, wherein
the first light guide segment is configured to output the light incident from the first light source as output light with a square dot pattern, and
the second light guide segment is configured to output the light incident from the second light source as output light with a square dot pattern.

3. The LGP of claim 2, further comprising:
a diffuser, wherein
the diffuser is configured to change the output light corresponding to the first light guide segment to planar light, and
the diffuser is configured to change the output light corresponding to the second light guide segment to light with a stripe pattern.

4. The LGP of claim 3, wherein
a portion of the diffuser corresponding to the first light guide segment is configured to perform an isotropic diffusion, and
a portion of the diffuser corresponding to the second light guide segment is configured to perform an anisotropic diffusion.

5. The LGP of claim 4, wherein the diffuser is in a form of a single film.

6. The LGP of claim 4, wherein
the diffuser includes a first diffuser and a second diffuser,
the first diffuser is configured to perform a diffusion in the first direction, and
the second diffuser is configured to perform a diffusion in a second direction that is different from the first direction.

7. The LGP of claim 1, further comprising:
a light block, wherein
the light block configured to isolate the second light guide segment from the first light source from which the light is incident to the first light guide segment, and
the light block is configured to isolate the first light guide segment from the second light source from which the light is incident to the second light guide segment.

8. A display apparatus, comprising:
the first light source configured to provide a two-dimensional (2D) image through a panel;
the second light source configured to provide a three-dimensional (3D) image through the panel; and
the LGP of claim 1, wherein
the first light guide segment is configured to guide light incident from the first light source, and
the second light guide segment is configured to guide light incident from the second light source.

9. The display apparatus of claim 8, further comprising:
a diffuser, wherein
the diffuser is configured to change output light corresponding to the first light guide segment to planar light by diffusing the output light corresponding to the first light guide segment, and
the diffuser is configured to change output light corresponding to the second light guide segment to light with a stripe pattern by diffusing the output light corresponding to the second light guide segment, and
each of the first light guide segment and the second light guide segment is configured to output the output light with a discontinuous pattern.

10. The display apparatus of claim 9, wherein
a portion of the diffuser corresponding to the first light guide segment is configured to perform an isotropic diffusion, and
a portion of the diffuser corresponding to the second light guide segment is configured to perform an anisotropic diffusion.

11. The display apparatus of claim 10, wherein the diffuser is in the form of a single film.

12. The display apparatus of claim 10, wherein
the diffuser includes a first anisotropic diffuser and a second anisotropic diffuser,
the first anisotropic diffuser is configured to perform a diffusion in the first direction, and
the second anisotropic diffuser configured to perform a diffusion in a second direction different from the first direction.

13. The display apparatus of claim 8, wherein
the first light guide segment is configured to output the light incident from the first light source as first output light with a stripe pattern corresponding to a second direction,
the second light guide segment includes a plurality of light path change patterns,
the second light guide segment is configured to output the light incident from the second light source as second output light with a discontinuous pattern using the light path change patterns,
the display apparatus further includes an anisotropic diffuser,
the anisotropic diffuser is configured to change the first output light to planar light by diffusing the first output light in the first direction, and
the anisotropic diffuser is configured to change the second output light to light with a stripe pattern by diffusing the second output light in the first direction.

14. The display apparatus of claim 8, wherein
the first light source is in a first side of the LGP, and
the second light source is in a second side of the LGP.

15. The display apparatus of claim 8, wherein
one of the first light source and the second light source is in a side of the LGP, and
an other of the first light source and the second light source is in a form of a plate facing a bottom surface of the LGP.

16. The display apparatus of claim 8, wherein
the display apparatus is configured to turn the first light source on in a portion of the panel corresponding to a first region and to turn the second light source on a portion of the panel corresponding to a second region in order to simultaneously provide the 2D image and the 3D image,
the display apparatus is configured to output the light incident from the first light source through at least a portion of the first light guide segment corresponding to the first region, and the display apparatus is configured to output the light incident from the second light source through at least a portion of the second light guide segment corresponding to the second region.

17. The LGP of claim 1, further comprising:
a light barrier configured to separate the first light guide segment from the second light guide segment.

18. The LGP of claim 17, wherein
the light barrier is doped to have a different refractive index than the first light guide segment and the second light guide segment, to optically separate the first light guide segment and the second light guide segment.

19. The LGP of claim 17, wherein
the light barrier is a space defined by a cut between the first light guide segment and the second light guide segment.

20. The LGP of claim 19, further comprising:
a material on at least a portion of the light barrier, wherein
the material has a reflectance equal to or greater than a threshold, and
the light barrier optically separates the first light guide segment from the second light guide segment.

21. The LGP of claim 17, wherein
the first light guide segment includes a light guide configured to output a light incident from the first light source as first output light with a stripe pattern corresponding to a second direction, and
the second light guide segment includes a light path change pattern configured to change a direction of a light incident from the second light source and to output the light as second output light with a square dot pattern.

22. The LGP of claim 21, further comprising:
an anisotropic diffuser configured to scatter at least one of the first output light and the second output light in the first direction.

23. A light guide plate (LGP) comprising:
a first light guide segment and a second light guide segment alternately arranged in a first direction,
the first light guide segment being configured to guide light incident from a first light source used to generate a two-dimensional (2D) image,
the second light guide segment being configured to guide light incident from a second light source used to generate a three-dimensional (3D) image; and
one of an anisotropic diffuser and an other diffuser above the first light guide segment and the second light guide segment, wherein
the first light guide segment is configured to output the light incident from the first light source as first output light with a stripe pattern corresponding to a second direction,
the second light guide segment is configured to output the light incident from the second light source as second output light with a square dot pattern,
the anisotropic diffuser is configured to change the first output light to planar light by diffusing the first output light in the first direction, and the anisotropic diffuser is configured to change the second output light to light with a stripe pattern by diffusing the second output light in the first direction,
the other diffuser includes a first region and a second region,
the first region is configured to change the first output light to planar light by isotropically diffusing the first output light, and
the second region is configured to change the second output light to light with a stripe pattern by anisotropically diffusing the second output light.

24. The LGP of claim 23, wherein the one of an anisotropic diffuser and an other diffuser is the anisotropic diffuser.

25. The LGP of claim 23, wherein the one of an anisotropic diffuser and an other diffuser is the other diffuser.

26. A display apparatus, comprising:
a light guide plate (LGP) including a plurality of light guide segments, the light guide segments being arranged side by side in a first direction, and the light guide segments being separated from each other by a light barrier;
a first anisotropic diffuser above the light guide segments,
the first anisotropic diffuser being configured to change light with a discontinuous pattern output from a first light guide segment among the light guide segments to a first output light with a stripe pattern corresponding to a second direction, the first light guide segment being configured to provide of a two-dimensional (2D) image; and
a second anisotropic diffuser above the first anisotropic diffuser,
the second anisotropic diffuser being configured to change the first output light to planar light by diffusing the first output light in the first direction.

27. The display apparatus of claim 26, further comprising:
a first light source configured to be turned on to input a light to the first light guide segment in order to provide the 2D image; and
a second light source configured to be turned on to input a light to a second light guide segment among the light guide segments in order to provide the 3D image, wherein
the second light guide segment and the first light guide segment have different structures.

28. The display apparatus of claim 27, wherein
the first anisotropic diffuser is not to be formed on the second light guide segment to limit a second output light output from the second light source from being scattered in the second direction, and
the second anisotropic diffuser is configured to change the second output light to light with a stripe pattern corresponding to the first direction by diffusing the second output light in the first direction.

* * * * *